United States Patent
Quinonez et al.

(10) Patent No.: US 11,890,814 B2
(45) Date of Patent: Feb. 6, 2024

(54) DATA AGGREGATION AND ANALYTICS FOR DIGITAL MANUFACTURING

(71) Applicant: Kemeera Inc., Oakland, CA (US)

(72) Inventors: Carlo Quinonez, Oakland, CA (US); Skyler Brungardt, Oakland, CA (US)

(73) Assignee: Kemeera, Inc., Oakland, CA (US)

( * ) Notice: Subject to any disclaimer, the term of this patent is extended or adjusted under 35 U.S.C. 154(b) by 0 days.

(21) Appl. No.: 17/516,489

(22) Filed: Nov. 1, 2021

(65) Prior Publication Data

US 2022/0048253 A1    Feb. 17, 2022

Related U.S. Application Data

(63) Continuation of application No. 15/644,669, filed on Jul. 7, 2017, now Pat. No. 11,161,307.

(51) Int. Cl.
| | |
|---|---|
| *G06F 3/12* | (2006.01) |
| *B29C 64/386* | (2017.01) |
| *H04L 69/16* | (2022.01) |
| *G06Q 50/04* | (2012.01) |
| *G06Q 10/0639* | (2023.01) |

(Continued)

(52) U.S. Cl.
CPC ............ *B29C 64/386* (2017.08); *B33Y 50/00* (2014.12); *G06F 3/1211* (2013.01); *G06F 3/1273* (2013.01); *G06F 3/1288* (2013.01); *G06F 3/1293* (2013.01); *G06Q 10/06395* (2013.01); *G06Q 50/04* (2013.01); *H04L 67/01* (2022.05); *H04L 69/16* (2013.01)

(58) Field of Classification Search
CPC ..... B29C 64/386; B33Y 50/00; G06F 3/1211; G06F 3/1273; G06F 3/1288; G06F 3/1293; G06Q 10/06395; G06Q 50/04; H04L 67/01; H04L 69/16
See application file for complete search history.

(56) References Cited

U.S. PATENT DOCUMENTS

| | | | |
|---|---|---|---|
| 7,698,398 B1 * | 4/2010 | Lai .................. | G06Q 30/00 709/228 |
| 10,776,355 B1 | 9/2020 | Batsakis et al. | |
| 10,826,716 B2 | 11/2020 | Gould et al. | |

(Continued)

OTHER PUBLICATIONS

"Orbix 6.3.7 Enterprise Messaging Guide: Java", Aug. 5, 2014, Micro Focus, 165-193. (Year: 2014).*

*Primary Examiner* — John R Wallace
(74) *Attorney, Agent, or Firm* — Haynes Beffel & Wolfeld LLP; Ernest J. Beffel, Jr.

(57) ABSTRACT

Systems and methods for aggregating and analyzing digital manufacturing data are disclosed. An aggregator can collect output data generated by a number of digital manufacturing machines. The output data can be filtered and transmitted to a server for storage in a database. One or more clients can access the data in the database via an API. This can extract 3D printer data, transform it into a canonical form, and upload it to a network-based database. These services can interact using a client-centric messaging system like Kafka or, more generally, a message manager. When a client's producer sends a message, the messaging system responds that the message request either can or cannot be processed. If the message can be processed, then the aggregator sends the message; otherwise the producer can retry at a future time.

23 Claims, 32 Drawing Sheets

(51) Int. Cl.
*B33Y 50/00* (2015.01)
*H04L 67/01* (2022.01)

(56) References Cited

U.S. PATENT DOCUMENTS

| | | |
|---|---|---|
| 2010/0076935 A1 | 3/2010 | Hussain et al. |
| 2014/0032531 A1* | 1/2014 | Ravi ................. G06F 16/93 |
| | | 707/722 |
| 2014/0035182 A1 | 2/2014 | Boyer et al. |
| 2015/0058912 A1* | 2/2015 | Raskin .................. G06F 21/85 |
| | | 726/1 |
| 2015/0256435 A1 | 9/2015 | Sum et al. |
| 2015/0263886 A1* | 9/2015 | Wang ................ H04L 12/2809 |
| | | 370/254 |
| 2015/0356301 A1 | 12/2015 | Diehl et al. |
| 2016/0101568 A1 | 4/2016 | Mizes et al. |
| 2016/0294784 A1* | 10/2016 | Hopkins ................ H04L 63/06 |
| 2016/0350173 A1 | 12/2016 | Ahad |
| 2017/0116210 A1 | 4/2017 | Park et al. |
| 2018/0293034 A1* | 10/2018 | Uchida ................ G06F 3/1255 |
| 2018/0349254 A1 | 12/2018 | Hui |

\* cited by examiner

CLIENT INTERFACE

Product Overview

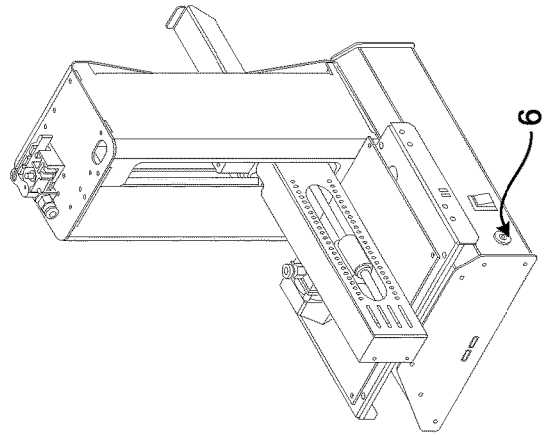
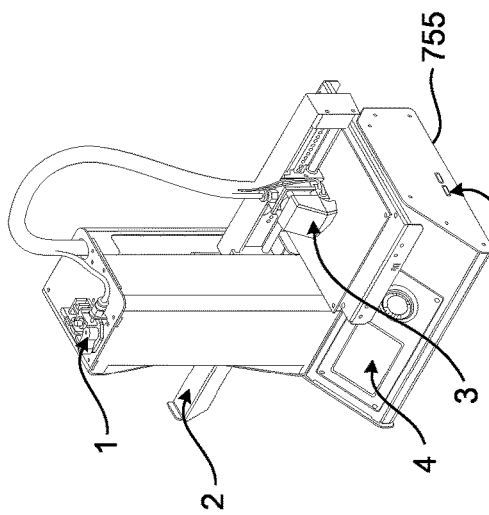
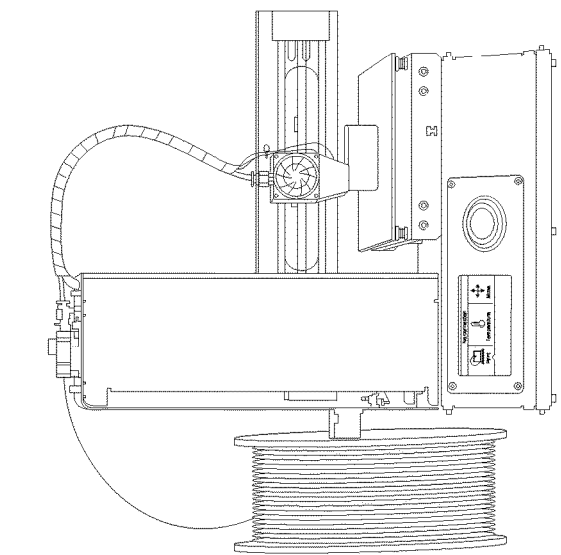

1. Feed Mechanism
2. Filament Rack
3. Extruder
4. LCD Display
5. Micro USB and Micro SD Ports
6. Input Power Jack and Power Switch Select Mini 3D Printer

SOFTWARE INSTALLATION AND SETUP

As you've seen, you can print a model directly from a gcode file on a microSD™ card and this is the preferred method, as it does not require a continuous connection to your computer. You can download gcode files for the microSD card and print them without having to build any model files.

Source: Monoprice User's Manual P/N 15365 (Copyright 2016)

FIG. 7B

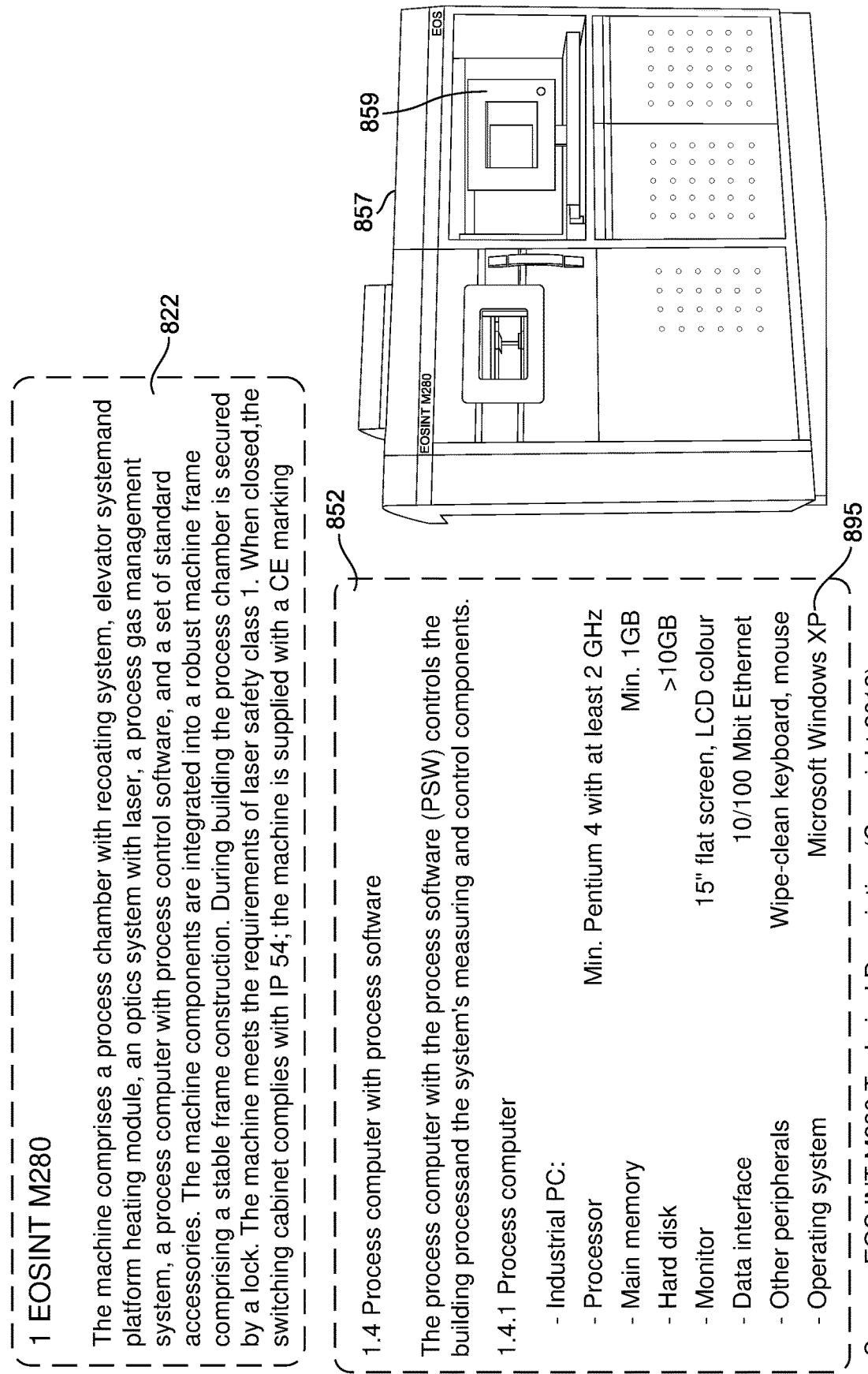

1 EOSINT M280

The machine comprises a process chamber with recoating system, elevator system and platform heating module, an optics system with laser, a process gas management system, a process computer with process control software, and a set of standard accessories. The machine components are integrated into a robust machine frame comprising a stable frame construction. During building the process chamber is secured by a lock. The machine meets the requirements of laser safety class 1. When closed, the switching cabinet complies with IP 54; the machine is supplied with a CE marking

1.4 Process computer with process software

The process computer with the process software (PSW) controls the building process and the system's measuring and control components.

1.4.1 Process computer

- Industrial PC:
- Processor     Min. Pentium 4 with at least 2 GHz
- Main memory     Min. 1GB
- Hard disk     >10GB
- Monitor     15" flat screen, LCD colour
- Data interface     10/100 Mbit Ethernet
- Other peripherals     Wipe-clean keyboard, mouse
- Operating system     Microsoft Windows XP Source: EOS INT M280 Technical Description (Copyright 2013)

FIG. 8B

Physical Description

The Objet1000 Plus 3D printing system consists of the following main components:
* printer
* printer computer (built into the printer) —909
* printer-server workstation (built into the printer) —919

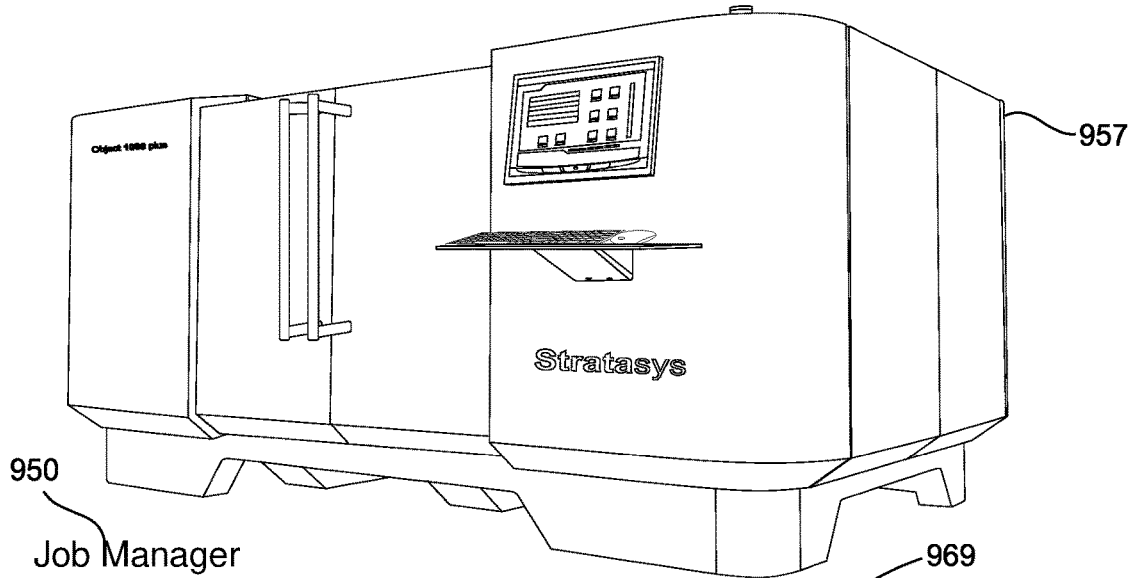

950

Job Manager

957

969

The Job Manager screen is <u>different for client workstations</u> and for the computer connected directly to the Objet 3D printer.  979

• In Objet Studio installed on the <u>directly-connected computer (server)</u>, the Job Manager screen displays the queue and status for all jobs sent to the 3D printer by the server itself and by all client computers on the network. displayed can be edited and manipulated.  989

• In Objet Studio installed on <u>client computers</u>, the Job Manager screen displays the queue and status <u>only</u> for jobs sent to a 3D printer server from that computer. <u>Only</u> these jobs can be edited and manipulated from the client computer.

Client computers can be connected, via the local network, to different Objet 3Dprinters, but <u>only to one at a time</u>. The Job Manager screen displays the status ofthe 3D printer to which the client is currently connected
990

Source: Objet1000 Plus 3D Printer System
Site Preparation Guide DOC-6500 Rev. I © 2017
User Guide DOC-06810 Rev. A © 2015

FIG. 9B

COMPONENTS OF THE FORTUS 900MC
- Insight™ Software Package —917
- A generic computer workstation (not sold by Stratasys) —927
- The Fortus 900mc System
- Modeling Material
- Support Material

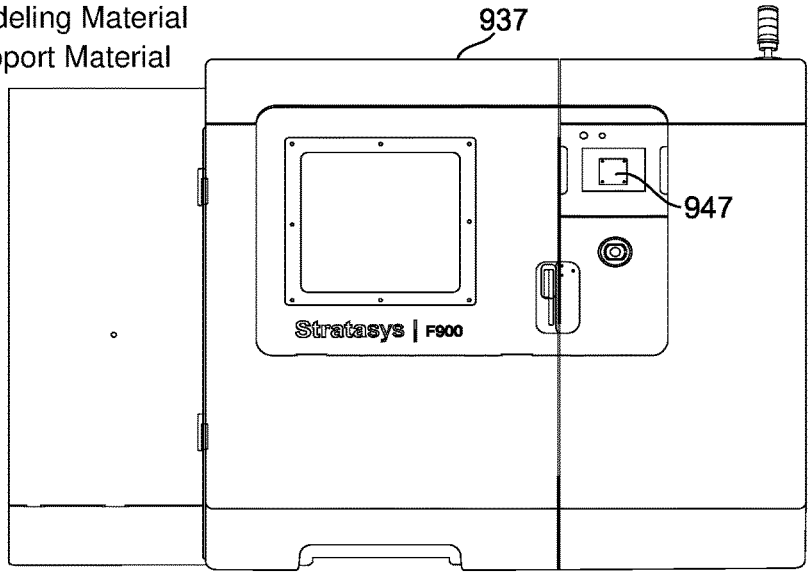

937
947

To build a job, you must send the job file to the system from the Insightapplication installed on your workstation. Jobs are sent in a CMB formatand placed in the job queue (stored on the system hard drive) —957

MAKING THE NETWORK CONNECTION
Processed job files are transferred to the Fortus system through your facility's Ethernet network. <u>An RJ45 network connector</u> is located on the top rightcorner at the back of the system. —967

ONBOARD COMPUTER
The onboard computer is the <u>central control unit</u> for the Fortus 900mc.This computer also runs the <u>touchscreen software</u> that provides for the system's user interface. —977

Workstation Requirements 987
For Insight version 11.0:

☐ Operating System: <u>Microsoft Windows</u> 10 (Pro, Enterprise, Education), Microsoft Windows 8.1 and Windows 8 (Pro, Enterprise), Microsoft Windows 7

..................

☐ <u>Ethernet: 100 Base T or 10 Base T</u> —997

Source: Fortus 900MC Production System User Guide DOC-402737-0001_REV_A © 2016
Insight Workstation Requirements 107694-0019

FIG. 9C

```
/* EOS background polling service */
/** Searches for an EOS database and starts the
    monitoring service if one is found **/ var start = function(printerinfo) {
    var deferred = Q.defer();
    connectionstring = formatConnectionString(printerinfo);
    installExtractionQueueAsync(printerinfo)
        .then(function() {
            amPrinterApi.addHostComputer();
..........
            eventBuffer = new amEventBuffer(printer);

loop();
            deferred.resolve(true);
        },
        return deferred.promise;
    }
..........
    /** Installs the extraction queue feature on the database to monitor for
changes on our analytics tables and log them to queues **/
    var installExtractionQueueAsync = function(printerinfo) {
..........
        (function() {
            //Adds a trigger to the database
            return query(
            "create or replace trigger NEW_JOB \
            after insert on EOSLOG.JOBS_TBL \
            referencing new row as newJob \
            for each row mode DB2SQL \
            begin atomic \
            insert into EOSLOG.JOBS_QUEUE values (newJob.JO_ID); \
            end")
        });
    }

/** EOS database monitoring service loop */
    var loop = function() {
        var rows;
        pull rows from the processing queue in the database
        return query(
        "select JT.JO_ID, JT.JO_TIMESTAMP as START_TIME, \
        LT.LD_TIMESTAMP as END_TIME, JT.MAT_NAME, JT.JO_USER \
        from EOSLOG.JOBS_QUEUE JQ inner join EOSLOG.JOBS_TBL \
        JT on JQ.JO_ID = JT.JO_ID \
..........
        order by JT.JO_TIMESTAMP desc \
        fetch first 100 rows only;")
..........
        .finally(function() {
            recur after polling period
            setTimeout(function() { loop(); }, pollTimeInterval)
        });
```

JOBPARAMS_TBL
Contains job parameters in XML format with timestamps.

| Field | Sample Data |
|---|---|
| JP_TIMESTAMP | 2016-07-03 11:34 |
| JP_TEXTDATA | JobFileName = C:/Program Files/eos/psw/Service/temperature_150.job\nTime = 2007/07/03 11:34:28\nModelType = P390\nSerialNo = SI743\nMaterial = PA2200\nLayerThickness = 0.150 |
| PT_ID | 3 |
| JO_ID | SI74320070703113244 |

JOBPROCINFO_TBL
Contains time information on individual jobs, including "preprocessing" and "postprocessing" time periods.

| Field | Sample Data |
|---|---|
| JO_ID | SI74320070703113244 |
| JOPI_PREPROCESSTIME | 0:01:49.897 |
| JOPI_JOBTIMEWITHOUTINTERRUPT | 0:50:30.805 |
| JOPI_TIMESTAMP | 2016-07-03 11:36 |

JOBPARTSINFOS _TBL
Contains binary blobs of parts data.

| Field | Sample Data |
|---|---|
| JO_ID | SI74320070703113244 |
| IT_ID | 4 |
| JPI_TIMESTAMP | 2016-07-03 11:38 |
| JPI_PARTSDATA | 010000000015890B0AD7A370C963E1400A0000000015890B000000000000000020000000015890BE17A14AEF744E1400300000015890B14AE47E162F3E0400400000000158 90BE17A14AE130BE14005000000015890BE17A14AE47B5E04006000000015890B14AE47E1AE22E040070000000015890BE17A14AEF8B4E04008000000015890BE17A14AEEB06E14009000000015890BE17A14AEFBB4E040 |

FIG. 11A

JOBS_TBL
Contains basic info on individual jobs. Keyed on JO_ID, which is used to identify/join to job information in other tables.

| Field | Sample Data |
|---|---|
| JO_INC | 315 |
| JO_ID | LV-SLS390-HP20130523173239 |
| JO_TIMESTAMP | 2016-05-29 17:32 |
| JO_FILENAME | C:/Program Files/eos/psw/Service/QA_Job_P3X_PA2200_150/052313_robots.Job |
| JO_USER | Fdmmodeler |
| MAT_NAME | PA2200 |
| MAT_THICKNESS | 120 |
| JO_DEFJOBNAME | ../Config/EOS_DefaultJobs/PA2200/PA2200_120_default.job |
| JO_ZPREC | 1000 |

PARTS_TBL
Contains basic info on parts. Keyed on P_PARTID.

| Field | Sample Data |
|---|---|
| P_PARTID | 1 |
| JO_ID | S174320070703113247 |
| P_TIMESTAMP | 2016-06-29 15:12 |
| P_FILEPATH | temperature_150_slis/cross1_c.sli |
| P_X | -10 |
| P_Y | -10 |
| P_Z | 2.85 |
| P_ROT | 0 |
| P_MIRROR | 0 |
| P_XSCALE | 0 |
| P_YSCALE | 0 |
| P_MINX | 20.93 |
| P_MINY | 20.93 |
| P_MINZ | 9 |
| P_MAXX | 72.48 |
| P_MAXY | 72.48 |
| P_MAXZ | 28.2 |
| P_BEAMOFFSET | 0 |
| EP_NAME | Speed |

FIG. 11B

```
1211
    /** Start listening to packets */
    function startPackets(self) {
        amLog.info("Objet starting listening to packets...");
1231    var deferred = Q.defer();
        ...........
        self.objetCap.start(self.printer.printer_addr)
        .then(null, function(err) {
            amLog.error(err, "Error starting Objet packet capture");
            deferred.resolve(false);
        },                                                      1253
        function(packet){
        Check for a notification telling us we connected
            if(packet && packet.connected) {
            self.packetsStarted = true;
            amLog.info("Objet packet listening state: ", packet.connected);
            deferred.resolve(true);                     1273
            }
            else {
            var parsedPacket = amObjetPacket.process(packet);
            if(parsedPacket) {
                sendToLog(self, parsedPacket);
                Poll the log manually after getting these packets
                if(parsedPacket.command ===
                    amObjetPacket.PACKET_STOP_JOB ||
                    parsedPacket.command ===
1295                amObjetPacket.PACKET_END_JOB ||
                    parsedPacket.command ===
                    amObjetPacket.PACKET_START_JOB ||
                    parsedPacket.command ===             1297
                    amObjetPacket.PACKET_RESUME_JOB)
                    {self.objetLogFiles.poll();} parsedPacket.computer_date = Math.floor((new
                        Date).getTime()/1000);            1299
                    parsedPacket.event_type = "packet";
                    addToBuffer(self, parsedPacket);
                }
            }
        });
    return deferred.promise;
```

FIG. 12A

```
/** Start the background polling. Returns a promise with true/false
indicating success/fail */
amBackgroundObjet.prototype.start = function(printer) {        ⎯⎯⎯ 1202
     var deferred = Q.defer();
     if(!printer || !printer.printer_addr) {
          deferred.reject(new Error("Printer address not specified"));
          return deferred.promise;
     }                                                 ⎯ 1222
     this.printer = printer;
     this.buffer = new amEventBuffer(printer);  ⎯⎯⎯
     var self = this;
                                                          ⎯ 1242
     Q.allSettled([startLogs(this),     startPackets(this)])
     .then(function(results) {
          // Only require one to have started
          if(results[0].state === "fulfilled" && results[0].value === true
||
               results[1].state === "fulfilled" && results[1].value ===
true){
                    deferred.resolve(true);
                    self.pinger.start(self.printer);
          } else {
                    deferred.resolve(false);
          }
     });

return deferred.promise;
};

/** Stop background polling */
amBackgroundObjet.prototype.stop = function() {  ⎯ 1262
     if(this.objetCap) {
          this.objetCap.stop();  ⎯⎯⎯
     }                                              ⎯ 1282
     if(this.objetLogFiles) {
          this.objetLogFiles.stop();  ⎯⎯⎯
     }                                          ⎯ 1292
     if(this.pinger) {
          this.pinger.stop();  ⎯⎯⎯
     }
};
```

FIG. 12B

| Address (hex) | Hexadecimal | Decoded | Description |
|---|---|---|---|
| Byte 00 | 02 | 02 | Packet header |
| Byte 01 | 4f | 4f | Packet material information |
| Bytes 3d-40 | 1a000000 | 79 (decimal) | Tray rear offset in mm. (byte reversed) |
| Bytes 41-44 | 22000000 | 26 (decimal) | Tray front offset in mm. (byte reversed) |
| Bytes 45-48 | 8d010000 | 472 (decimal) | Tray Y size (byte reversed) |
| Bytes 49-52 | 5665726f436c65617200 | VeroClear | Model Resin 1 |
| Bytes 69-74 | 46756c6c4375726537303500 | FullCure705 | Support Resin |
| Bytes 95-9d | 5665726f426c756500 | VeroBlue | Model Resin 2 |

```
Offset 0 1 2 3 4 5 6 7 8 9 a b c d e f
0000   02 4f ae 00 00 00 4c 6d 13 54 55 32 00 00 00 60  .O...Lm.TU2...`
0010   09 00 00 00 00 00 00 00 00 00 00 00 00 00 00 84  ................
0020   03 00 00 00 00 80 41 b0 04 00 00 2c 01 00 00 01  ......A....,....
0030   01 05 00 00 00 00 00 f0 41 bf 00 00 00 1a 00 00  ........A.......
0040   00 22 00 00 00 8d 01 00 00 56 65 72 6f 43 6c 65  ."......VeroCle
0050   61 72 00 3c fa 8b 04 21 a5 a7 00 11 fc 8b 04 00  ar.<...!........
0060   00 00 00 d8 01 00 00 7a 38 46 75 6c 6c 43 75 72  .......z8FullCur
0070   65 37 30 35 00 8b 04 27 21 a8 00 09 fc 8b 04 09  e705...'!.......
0080   fc 8b 04 08 00 00 00 8c 2a 00 00 bd 43 b2 9d 80  ........*...C...
0090   40 01 00 00 00 56 65 72 6f 42 6c 75 65 00 00 01  @....VeroBlue...
00a0   00 00 00 3c 00 00 00 00 08 00 00 00 f1 e2 90 7c b7  ...<...........|.
00b0   24 80 7c d8 01                                   $.|..
```

FIG. 14

| Address (hex) | Raw Hex | Decoded | Description |
|---|---|---|---|
| Bytes b5-bc | 706172744d696e58 | partMinX | part minimum X value |
| Bytes be-c5 | 302e3431343434235 | 0.414425 | 0.414425 mm. |
| Bytes c9-d0 | 706172744d696e59 | partMinY | part minimum X value |
| Bytes be-c5 | 302e3237363431 | 0.27641 | 0.27641mm. |
| Bytes b5-bc | 706172744d696e5a | partMinZ | part minimum X value |
| Bytes be-c5 | 302e30313330363131 | 0.0130611 | 0.0130611mm. |

```
Offset  0 1 2 3 4 5 6 7 8 9 a b c d e f
. . . . . . . .
0030    00 36 32 64 00 00 32 30 32 30 37 0a 09 2d 70 61   .62d..20207..pa
0040    72 74 43 6f 6e 73 75 6d 65 64 20 30 2e 33 39 31   rtConsumed 0.391
0050    33 33 0a 09 2d 09 73 75 70 70 6f 72 74 43 6f 6e 73   33..supportCons
0060    75 6d 65 64 20 30 2e 30 36 33 32 34 30 31 0a 09   umed 0.0632401..
0070    2d 70 61 72 74 54 69 70 20 54 31 36 0a 09 2d 73   -partTip T16..-s
0080    75 70 70 6f 72 74 54 69 70 20 54 31 36 0a 09 2d   upportTip T16..-
0090    74 6f 74 61 6c 4c 61 79 65 72 73 20 31 32 33 0a   totalLayers 123.
00a0    09 2d 63 75 72 72 65 6e 74 4c 61 79 65 72 20 31   .-currentLayer 1
00b0    30 37 0a 09 2d 70 61 72 74 4d 69 6e 58 20 30 2e   07..-partMinX 0.
00c0    34 31 34 34 32 35 0a 09 2d 70 61 72 74 4d 69 6e   414425..-partMin
00d0    59 20 30 2e 32 37 36 34 31 0a 09 2d 70 61 72 74   Y 0.27641..-part
00e0    4d 69 6e 5a 20 30 2e 30 31 33 30 36 31 31 0a 09   MinZ 0.0130611..
00f0    2d 70 61 72 74 4d 61 78 58 20 31 2e 34 37 39 32   -partMaxX 1.4792
0100    33 0a 09 2d 70 61 72 74 4d 61 78 59 20 31 2e 34   3..-partMaxY 1.4
0110    34 32 37 39 0a 09 2d 70 61 72 74 4d 61 78 5a 20   4279..-partMaxZ
. . . . . . . .
```

FIG. 15

Creating jobs
Jobs are created from the `currentJob` event.

`currentJob` fields map to a job as follows:

* `job_id` = `currentJob.jobId` or `currentJob.jobid`

* `name` = `currentJob.jobName` or `currentJob.jobName[0]`

* `state` = derived from `currentJob.completionStatus`

* `total_layers` = `currentJob.totalLayers`

* `current_layer` = `currentJob.currentLayer`

* `width` = `currentJob.partMaxX - currentJob.partMinX`  — 1615

* `height` = `currentJob.partMaxY - currentJob.partMinY`  — 1666

* `depth` = `currentJob.partMaxZ - currentJob.partMinZ`  — 1667

* `materials.name` = `currentJob.partMatlName` and `currentJob.supportMatlName`

* `materials.estimated` = `currentJob.partTotalMatl` and `currentJob.supportTotalMatl`

* `materials.consumption` = `currentJob.partConsumed` and `currentJob.supportConsumed`

FIG. 16

```
{"status":{"code":"ok","message":"Gotjobs"},
"data":[{"current_layer":0,
"date":{"end":"2016-05-30T00:55:58.000Z",
"estimate":44167,
"start":"2016-05-30T00:55:49.000Z"},
"depth":305.48,
"error":null,
"height":37.73,
"id":"00:e0:f4:2d:ba:f9_1432947349",          ⌐ 1721
"job_id":"1432950931",
"material_units":"g",                          ⌐ 1731
"materials":
      [{"consumption":20.1,           ⌐ 1742
        "estimated":738.8,
        "name":"FullCure705",
        "tank":"support_tank"},
       {"consumption":0.1,            ⌐ 1752
        "estimated":631.8,
        "name":"TangoBlack+",
        "tank":"model1_tank"},
       {"consumption":0.1,            ⌐ 1762
        "estimated":22.4,
        "name":"VeroBlack",
        "tank":"model3_tank"},
       {"consumption":0.1,            ⌐ 1772
        "estimated":233.1,
        "name":"VeroWhite",
        "tank":"model2_tank"}],
       "models":[{"build_style":       ⌐ 1783
              "glossy",
              "depth":17.53,           ⌐ 1784
              "height":8.66,
              "name":"052615_BumperSoft",   ⌐ 1785
              "polygon_count":6240,
              "width":17.61,           ⌐ 1786
              "x":320.38,
              "y":376.68},
         {"build_style":"glossy",
              "depth":17.53,
              "height":8.66,
              "name":"052615_BumperSoft",
              "polygon_count":6240,
              "width":17.61,
              "x":341,
              "y":376.68},
```

FIG. 17

| Printer | Process | Progress | Est. End Time | Materials | Last Update |
|---|---|---|---|---|---|
| Camilla-SD254 | Polyjet | | Finished | | - |
| Gonzo-SD265 | Polyjet | | Finished | | - |
| Rizzo-SD302 | Polyjet | | Finished | VeroWhite, VeroClear | 6 days ago |
| Rowlf-SD289 | Polyjet | | Finished | RGD515, RGD531 | 6 days ago |
| Scooter-SD290 | Polyjet | ▓▓ 2452 | 9:50am, Sat 17/10/15 | | - |
| Amethyst | FDM | | Finished | SR30 | 4 days ago |
| Garnet | FDM | | Finished | ULT9085, ULT_S | 4 days ago |
| Pearl | FDM | | Finished | NYL12 | 4 days ago |

DATA AGGREGATION AND ANALYTICS FOR DIGITAL MANUFACTURING

CROSS-REFERENCE TO RELATED APPLICATIONS

This application is a continuation of U.S. patent application Ser. No. 15/644,669, titled "Data Aggregation and Analytics for Digital Manufacturing", filed 7 Jul. 7, 2017, now U.S. Pat. No. 1,161,307, issued Nov. 3, 2021.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This specification relates generally to data aggregation and analytics for digital manufacturing. Data aggregation involves gathering, processing, and filtering data from multiple sources so that it can be analyzed collectively. Data analytics involves inspecting, analyzing, and modeling data to draw useful conclusions. Digital manufacturing encompasses any system where a physical object is fabricated from a digital model. Such systems include three-dimensional (3D) printers (also known as additive manufacturing), computer numeric control (CNC) machinery, laser cutters, robotic systems, and others.

SUMMARY OF THE DISCLOSURE

This specification describes technologies relating to data aggregation and analytics for digital manufacturing. Specifically, this specification describes techniques to collect, transmit, store, process, and visualize data used with digital manufacturing systems. In general, one innovative aspect of the subject matter described herein can be embodied in methods that enable process data from multiple digital manufacturing machines, such as error state, material consumption, or job scheduling, to be aggregated and visualized in real-time.

Particular embodiments of the systems described in this specification can be implemented to realize one or more of the following advantages. Detailed, real-time and historical data from a digital manufacturing system can be used to improve production efficiency and plan for future changes. However, digital manufacturing systems communicate and log data in numerous disparate protocols without standard application programming interfaces (API) to report events. The use of data aggregation and analytics across digital manufacturing systems enables data to be consolidated and accessible to all workers involved in the digital manufacturing process. Analysis and visualization of digital manufacturing data enables insights that aid increases in automation, efficiency, and machine utilization.

In some embodiments, a system for aggregating and analyzing data for digital manufacturing data includes a number of digital manufacturing machines that each includes a measurement tool and a processor for generating output data measured by the at least one measurement tool. An aggregator receives and filters the output data and sends the filtered output data to a server. The server stores the output data in a standardized format for retrieval by clients. The client can query the server for desired output data using an application programming interface ("API").

In some embodiments, a method for aggregating an analyzing digital manufacturing data is provided. The method includes receiving, at an aggregator, output data from a plurality of digital manufacturing machines, combining and filtering the output data at the aggregator, and sending the combined and filtered data to a server for storage in a database. A client device can query the server for desired data using an API.

The technology disclosed herein is illustrated with examples drawn from 3D printing, a rapidly growing digital additive manufacturing technology. 3D printing is coming into its own for commercial manufacturing of low volume products, especially low volume products in complicated shapes that are better suited to additive manufacturing than subtractive machining. The 3D printer market is fractured at this time, with vendors following their own minds on hardware, software, and communication protocols. This makes a multivendor 3D printer environment challenging. The challenge is likely to grow before it becomes easier, as new machine features and approaches are introduced at a rapid pace.

The one thing that is nearly standardized, reliance on a non-real-time operating system (non-RTOS), is a common handicap for 3D printers. The interrupt and priority structures of genuine RTOS are well adapted to industrial control. An operating system designed for text processing, such as the dominant Windows OS used on 3D printers or even Linux, does not assure that a manufacturing process will get timely attention and processing cycles if more than one process is running on the OS. This problem for machining spills over to communication among machines.

Our technology is described with respect to three example 3D printers that have a range of control structures or architectures. Each presents its own difficulties with respect to operating in a multivendor 3D printer environment.

The simplest of these examples is a 3D printer made by Monoprice. It is connected via USB to a user's computer, which acts as a printer-server to provide command and control functionality for the printer. The instructions recommend running a print job directly from a microSD card inserted into the printer, however this precludes obtaining in-process job status data. Alternatively, freely available software like Cura (https://ultimaker.com/en/products/cura-software) and Octoprint (http://octoprint.org/) allow jobs to be run directly from a controlling computer and can retrieve in-process status information. The downside is that the USB feed must not be interrupted, because the buffer in the printer itself holds only a few hundred bytes. The risk here is that if the computer feeding the USB stream is busy performing another task and unable to keep the printer buffer adequately filled, the geode stream may be interrupted, resulting in flaws or failure of an in-process 3D printing job.

The second example, a 3D printer manufactured by EOS, provides an ODBC/JDBC interface over Ethernet and relies on serial communications between a printer-server computer and a printer controller computer. 3D printing job s, including commands and pattern data, are sent to the 3D printer-server for delivery to the printer-controller. Status of 3D printer and any current jobs are buffered to a database running on the printer-server. The manufacturer provides software that can retrieve printer and job status information, however this software only views jobs which it sent and it may not interact well with similar software from other manufacturers needed to run their 3D printers.

The third example, an Objet 3D printing system, also provides a printer-server and a printer-controller, with communications between the two computers over Ethernet. Commands and pattern data are sent to a 3D printer via the printer-server, which determines when to forward data to the printer-controller. Again, the manufacturer supplied software may have operational limitations depending on where it is installed and it may not be compatible with 3D printer software from other sources that is installed on the same computer. Even if possible, from an operational standpoint in a multivendor environment, it may be cumbersome to run different software for each type of printer. For example, a simple request to display the status of all jobs running in the environment could require manually switching among different software programs and user interfaces.

A common denominator among these and other platforms is reliance on Microsoft Windows, a non-RTOS, to control printing in real time. That makes all three printers brittle in the face of queries from an analytics engine for job and status data that must be retrieved from a 3D printer. This is especially problematic for queries requiring a response from the computer that controls the printer in real time.

The technology disclosed repurposes Apache Kafka (https://kafka.apache.org/) or another message queuing system from high speed data ingestion and redistribution to slow and patient distribution of queries and assembly of replies. Other messages can be used or built with the features disclosed. Use of a queue or message manager minimizes the computing load on computers that are interacting with 3D printers in real-time so that they can be free to respond to the needs of the printers and the jobs they are running.

Kafka is designed as a shock absorber between a flood of producer generated events and slower consumers. In the case of a facility with perhaps dozens of different 3D printers generating an endless stream of job and status messages, this combination of speed and scalability has great benefits.

Kafka is client-centric in both a producer and consumer sense. A client's producer can request to send a message and Kafka will respond that the message was either delivered or that it was not delivered. Conversely, a client's consumer can consume messages when desired, i.e., messages are not "pushed" to a client. Thus, whether sending or receiving, clients have complete control over the process without ambiguity.

Further, Kafka delivers messages in the order sent, they are persistent and durable, and consumers can choose when to accept them. Using Kafka or a messaging system with similar capabilities, a private line or virtual private channel can be created between a specific network application and a computer serving or controlling a 3D printer, thus obviating the need for the computer to respond to or process messages unintended for its 3D printer(s). This private line can be closed after a single transaction or it can remain open as long as desired.

In this unusual application, a client-centric queued messaging system is applied to industrial control, rather than high speed sensor data ingestion. The tasks initiated by the messaging system in a target environment of multivendor 3D printers or other digital manufacturing machines are centered around monitoring status of the machines and the jobs they are running. Other tasks may include modifying job s and printer configurations.

For the three example 3D printers, different data extraction modules are supplied, all designed to merge seamlessly into a consistent architecture by communicating with common data aggregation software that interacts with the messaging system as resources permit, thereby mitigating brittleness.

The details of one or more implementations are set forth in the accompanying drawings and the description below. Other features and advantages will be apparent from the description and drawings.

BRIEF DESCRIPTION OF THE DRAWINGS

For a fuller understanding of the inventive embodiments, reference is made to the following description taken in connection with the accompanying drawings in which:

FIG. 7B is a picture and product overview diagram of a Monoprice Select Mini 3D printer that uses a USB interface.

FIG. 8B is a picture and product overview of an EOSINT M 280 3D printer.

FIG. 9B shows a picture of an Objet1000 Plus 3D printer system manufactured by Stratasys, Inc.

FIG. 9C shows a picture of a Stratasys Fortus 900MC 3D printer system, also manufactured by Stratasys, Inc.

FIG. 10 is a sample of working code that is designed to poll an internal IBM DB2 database included with the EOSINT M280 shown in FIG. 8B.

FIGS. 11A-11B show database schemas for some of the tables that can be retrieved from the EOSINT M280 3D printer.

FIG. 12A shows example code that starts the listening process for an Objet printer.

FIG. 12B shows example code that starts and stops background polling for an Objet printer.

FIGS. 13-14 show code used by the extractor software for decoding an Objet printer packet and an example of a raw packet.

FIG. 15 is a decoding of a Stratasys 3D printer packet capture.

FIG. 16 shows code for calculating values in a canonical form to be uploaded from an aggregator to a network services cluster.

FIG. 17 is a stream of data in JSON format that was captured during testing.

FIGS. 21, 22, 23 and 24 contain examples of displays that show various information about printers and jobs, including aggregated statistics compiled from many separate jobs from different printers.

DETAILED DESCRIPTION OF THE PREFERRED EMBODIMENTS

Described herein are implementations of data aggregation and analytics for use with digital manufacturing. Digital manufacturing generates large quantities of data for machine input (e.g. 3D model geometry and toolpath/machine instructions) and machine output (e.g. sensor readings, process state, error descriptions). The wide variety of input geometry used with digital manufacturing means that analyzing machine output data can vastly improve the understanding of system performance. As described below, data aggregation and analytics may be used to provide accessible real-time and historical data that can inform decision-making and improve manufacturing efficiency and planning.

Figure 1:
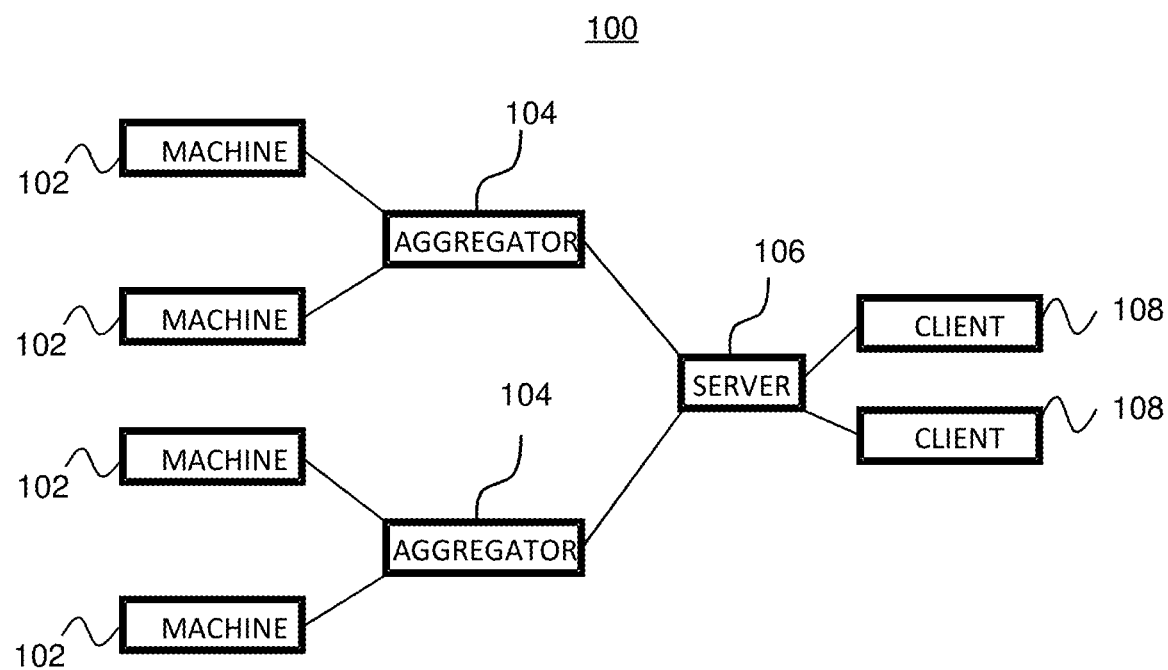
FIG. 1. illustrates an example system configuration, in accordance with various embodiments.

FIG. 1 shows a schematic view of system 100 for aggregating and analyzing digital manufacturing data, in accordance with various embodiments. System 100 include a number of machines 102, aggregators, 104, servers 106, and clients 108. Generally speaking, a system that operates in accordance with the principles disclosed herein can include any number of the aforementioned nodes as the concepts are scalable for use with small scale digital manufacturing concerns to large scale complex operations. Each device of system 100 may include one or more of a processor and/or control circuitry (e.g. a microprocessor or ASIC), a memory, communications circuitry (e.g a network interface card or other wired or wireless network interface component), a power supply, an input component (e.g. a keyboard, mouse, and/or a touchscreen display), a display assembly, and a bus that provides a data transfer path for transferring data and/or power between the various components of the device.

Machines 102 are all, or a subset of all, of the electronic tools used to manufacture a product using a digital manufacturing process. Non-limiting examples of machines 102 include: 3D printers, including vat photopolymerisation tools, material getting tools, binder jetting tools, material extruders, powder bed fusion tools, sheet laminators, and directed energy deposition tools; CNC machinery; laser cutters; other robotic systems capable of altering or measuring the physical attributes of a digitally manufactured product. The number of machines used in a particular digital manufacturing process depends generally on the complexity of the product being manufactured. For example, a particular product may require different tools for additive processing (e.g. one or more 3D printers), one or more tools for subtractive processing (e.g. a CNC machine or laser cutter), and one more tools for finish processing (e.g. a grinder or polisher.

Machines 102 receive data using the communications circuitry and/or input component. Data received at machines 102 can include, for example, one or more CAD files that describe the geometry of the product to be manufactured and/or processing parameters that describe how the tool should operate (e.g. material type, material color, operating temperature, and deposition times and rates). Received data may also include expected values for measurements a particular tool is configured to make during or after completion of its task.

This input data, received at machines 102 directly (e.g. utilizing an I/O device such as a keyboard) or via other network connected devices within system 100, may be compared to data output by machines 102. For example, a 3D printer equipped with one or more measurement apparatus that monitor operating conditions and results of the printing process (e.g. a thermometer for monitoring one or more operating temperatures, a laser interferometer for measuring the dimensions of the digitally manufactured product) can compare the measured data to one or more defined or otherwise expected values to ensure, in real-time, that the tool is operating as expected. In the event that data measured on a particular machine falls outside of a range given the input data, the machine may raise an alarm or write the error to a log file stored in memory.

Machines 102 also transmit output data to other devices of system 100 using the communications circuitry. In particular, machines 102 can transmit the measurement data discussed directly above and/or data regarding machine events such as errors, user interventions, or machine status. Transmitting output data to another device within a digital manufacturing system can advantageously promote efficiencies in the manufacturing process.

For example, if the output data for each machine in system 100 is available on a single device (e.g. one or more clients 108, as described in detail below), the task of monitoring the manufacturing process for errors, excursions, and other tooling-related problems is streamlined considerably. Rather than requiring humans to manually monitor the output data for each of machines 102, a task that traditionally would require a person to interact directly with each machine (a monumental task for complicated digital manufacturing operations that might use 10s, 100s, or 1000s of tools), output data from machines 102 can be aggregated and made available for analysis on a single device. Thus, a person tasked with monitoring a manufacturing process undertaken by system 100 may be presented with a wealth of real-time and historical data at a single device. An alarm set by one machine might, therefore, be sent to one or more remote terminals (e.g. clients 108) at which a decision may be made to take the machine offline for servicing, adjust its operating parameters in real time, or even just to ignore the alarm.

Aggregators 104 perform the task of aggregating output data from machines 102. In some embodiments, aggregators 104 receive raw data from machines 102, in the form of log files or network packets, for example. As depicted in FIG. 1, a digital manufacturing system might include several aggregators 104, each in communication with one or more machines 102. A typical usage scenario is inside of a company or institution with multiple machines. Data aggregation is performed for each machine as shown in FIG. 1. A given data aggregator is capable of working with one or more machines. The process of data aggregation can be performed in a number of ways by reading available data sources and forwarding relevant data on to a server. The following is a list of example data sources that can be used: log files saved on the system can be watched, read, and parsed to extract real-time data on machine events such as errors, user intervention, or machine status; network packets travelling between the machine and aggregator can be monitored to extract machine events as they happen—this monitoring may be passive listening, or active requests send to the machine to poll the latest data; machine or database API access allows a direct route to query machine status; and asset files, such as geometry files or machine instruction files can be analyzed to provide additional data including layout, size, and resolution.

In some embodiments, a single aggregator might collect data from all machines in a given digital manufacturing system. In other embodiments, multiple aggregators can be provided to collect and aggregate data from among machines 102. Provision of multiple aggregators for a digital manufacturing system might be useful in a number of circumstances. For example, if machines 102 in system 100 are located in geographically diverse locations, such as in the case of sister digital manufacturing plants, an aggregator might be provided for collect output data from the machines physically located in each location. As another example, one or more specialized aggregators might be provided to collect output data from similar types of machines, such as machines that output the same or substantially the same types of output data in the same or substantially the same format in order to ease the task of aggregating, filtering, and organizing the data. As yet another example, multiple aggregators may be provided for reasons of redundancy, data storage considerations, and/or advantages stemming from parallel processing of large quantities of output data.

Aggregators 104 may also perform the service of filtering or otherwise processing the output data received from machines 104. For example, machines 102 often provide a considerable amount of data that is not germane to tool operation, such as system check and/or debug data. Tools may also generate output data with empty data fields, as may be the case for tool measurements that are possible but either not enabled or not possible (e.g. cases in which tool is not physically equipped with the necessary measurement component). Other output data might represent bogus data—that is, mismeasurements of one type or another that fail to faithfully report true measured values. Aggregators 104 can delete or otherwise filter out these types of data output data before transmitting the data on to other devices within system 100.

Once aggregators 104 collect and process output data received from machines 102, the data may be sent to servers 106. It should be appreciated that the transmittal of data between machines 102, aggregators, 104, and servers 106 may occur continuously and in real time and/or on a batched basis. For example, machines 102 might transmit measurement data in the form of a continuous stream of network packets or as batched data in the form of a log file to aggregators 104. In turn, aggregators 104 can send data received from machines 102 immediately after processing, periodically, or after a threshold amount of data has been aggregated. Aggregators 104 may also cache data in case of a communication or network failure for later transmission.

Servers 106 are responsible processing and storing output data such that it is accessible to clients 108 via an application programming interface ("API"). In some embodiments, servers 106 can be equipped with persistent storage that hosts one or more databases. This database(s) can, in turn, store output data in a standardized format for retrieval by clients 108. In some embodiments, input data, such as expected values or value ranges for the output data or other relevant metadata, such as machine location or service and repair records, may also be stored in the database(s).

Data received from one or more aggregators 104 is received at the server for processing and storage. Incoming data includes information about the source of the data (e.g. an API key), so that it can be correctly assigned to the appropriate account; the make, model, and serial number of the machine; start and end times for a particular machine event; and data associated with a machine event. API keys are particularly important in the event where servers 106 are cloud-based devices that receive data from aggregators associated with many disparate entities (e.g. multiple companies, universities, research institutions, or individuals). As data is received, it can be segmented down to the level of a machine event, which is the most granular level of a machine communication protocol.

When received, the data associated with the machine events are stored in the database for further processing. As they are entered into the database, another process collates the events into a job structure that is updated as events pertaining to that job are received. Information stored in the jobs structure includes properties such as machine state, material usage, errors, and time of execution. A job is completed either when there is an error or the process has completed. The job structure provides detailed information about machine usage and performance and is the basis for computing business metrics from low-level data.

Business metrics include measures of machine information over a wide time span and require large quantities of information to be processed. The amount of data processed for a given request can be reduced if even just a portion of the relevant information has been previously processed by using a memoization caching mechanism. Memoization matches the inputs to a computation with the result. If further computations have identical arguments, the entire computation can be skipped and the previously calculated results returned with very little overhead. However, for each unique computation, the results have to be stored. To avoid excess storage use, memoized computations typically expire after a given amount of time or if storage usage has exceeded a particular threshold.

For ordered information whose aggregating operations are associative, memoization can also be used to determine partial results. For example, it may be useful to determine material usage over a given period for a machine, such as a 3D printer. The material usage data in all jobs for the printer over the given period can be accumulated into a histogram summing the amounts of each material used. If a second similar query is processed containing the already processed period, the memoization of that original computation can be used along with the relevant data from the remaining time periods.

Clients 108 query servers 106 for data using the API. An exemplary API for communicating data between servers 106 and clients 108 is provided below in the discussion concerning FIG. 3. The data returned to clients 108 may then be presented to a user to analytics.

Figure 2:
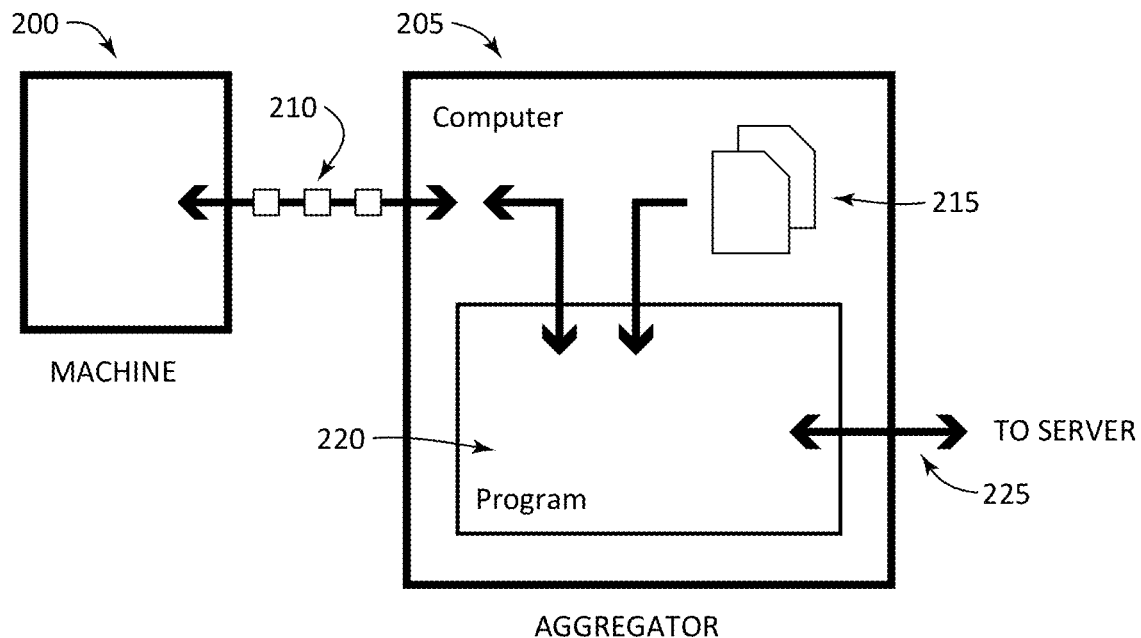
FIG. 2. illustrates an example system for data aggregation from a connected machine, in accordance with various embodiments.

FIG. 2 shows a schematic view of a system for aggregating and analyzing digital manufacturing data, in accordance with various embodiments. In particular, FIG. 2 a more detailed view of the machine and aggregator components system 100 of FIG. 1. The system includes software program 220 installed on aggregator 205, which is communicatively coupled to machine 200 directly or through a network.

Software program 220 listens to packets 210 sent from the machine 200 and reads log files 215 received from machine 200 for relevant data. In some embodiments, log files 215 are mounted over the network. As described above, aggregator 205 can filter and/or process the output data received from machine 200 may before sending it on to the server.

Figure 3:
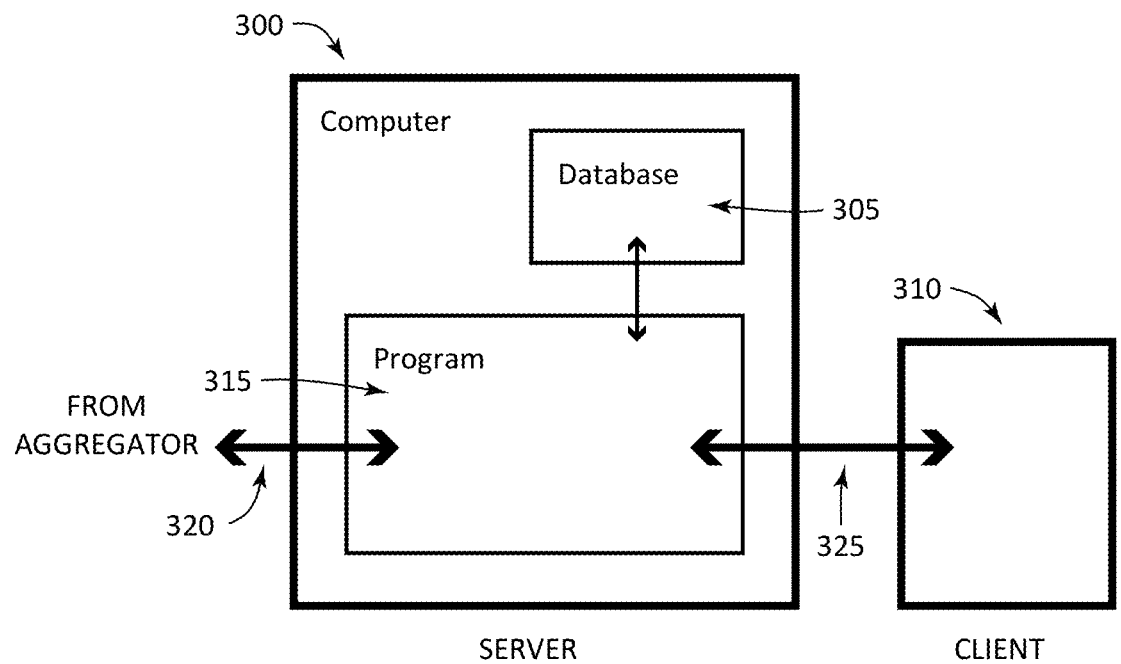
FIG. 3. illustrates an example system for data storage, retrieval, and communication with a connected client, in accordance with various embodiments.

FIG. 3 illustrates an example embodiment of a data server used for aggregation and analytics. Data from an aggregator 320 is received by a software program 315 running on a network connected computer 300. The data may be filtered, parsed, or processed before being stored in a database 305. When an API call is received from the client 310 the program 315 queries the database 305 for the appropriate data, then performs processing if necessary, before transmitting the response 325 back to the client 310. API functionality offers both low-level details about jobs and events, as well as high level statistics. For example, the API may provide a routine for returning a list of jobs such as below.

```
API Query: get_completed_jobs?api_key=12345&max_jobs=1
API Response:
{
  "status": {
  "code": "ok"
  },
  "data": [
  {
    "name": "Job12345",
    "id": "0660c945ee",
    "owner": "PC-2220",
    "completed": true,
    "time": {
      "start": "2015-01-12T19:34:37.000Z",
      "duration_estimate": 12910,
      "end": "2015-01-12T23:11:08.000Z",
      "duration": 12991
    },
    "machine": {
      "make": "Acme",
      "model": "Fortrose"
    },
    "materials":
    {
      "material": "material01",
      "start_amount": 820,
      "end_amount": 680,
      "consumption_estimate": 124.7,
      "consumption": 140.1
    },
    {
      "material": "materia102",
      "start_amount": 4720,
      "end_amount": 4520,
      "consumption_estimate": 145.4,
      "consumption": 200.1
    }
    ],
    "geometry": [
      "geometry_final_01",
      "geometry_final_02",
      "geometry_final_03"
    ]
  }
  ]
}
```

The API can be made available publicly to enable integration with other software systems. In the above example, the API key determines the functionality that is available to the API caller. The API key is checked against an internal database to log usage and set API access permissions.

On a client computer an interface is provided for data analytics and visualization. The preferred embodiment of the client interface is a browser-based web application. The client uses an API to query the server, then processes the received data into an appropriate format for visualization.

Figure 4:
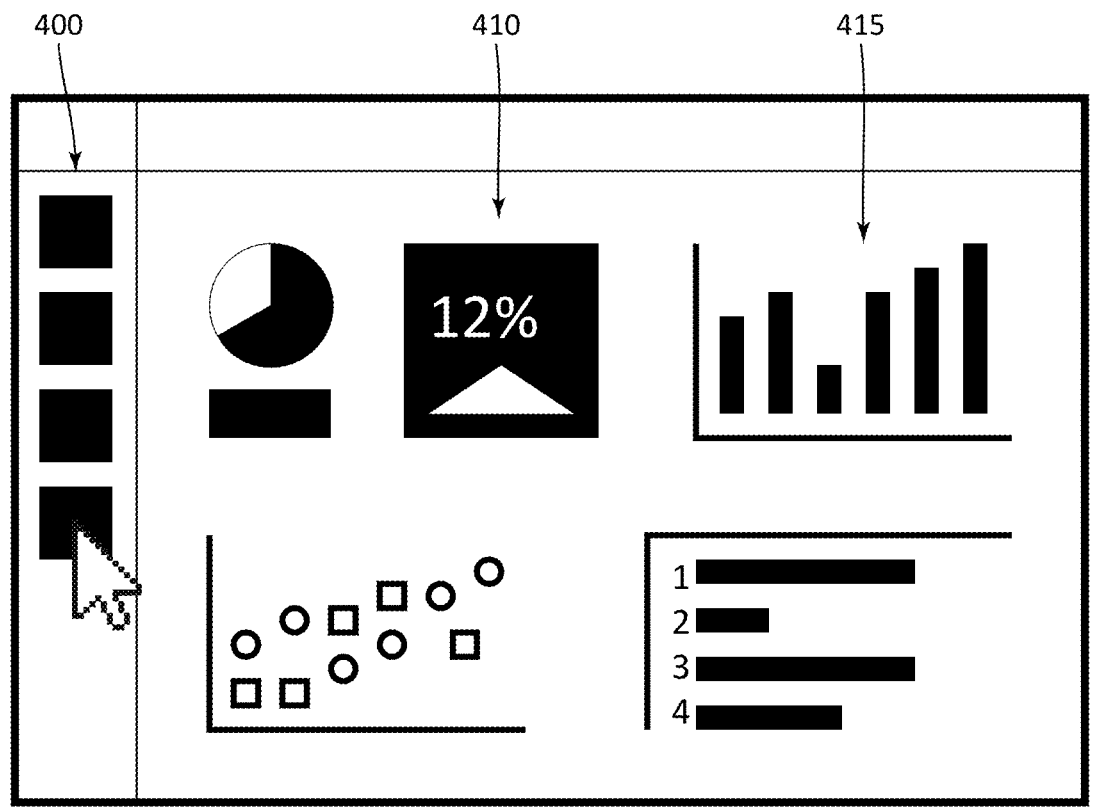
FIG. 4. illustrates an example client interface with visualizations for data analytics, in accordance with various embodiments.

FIG. 4 shows one example embodiment of a client interface. Navigation elements 400 are used to change content such as textual 410 and graphical 415 charts and illustrations. Content can be grouped according to categories such as machines, materials, geometry, time range, error events, and user events. The client interface may be customizable so that users can specify the exact data they want visualized. An interface can be provided that allows users to choose different options for data sources, visualization formats, and layout. The client interface may provide a scripting or plugin feature to allow programmatic control over how data is visualized.

The client interface typically provides access to aggregated data from all machines under a given account. However in some scenarios it may be useful to compare data between accounts to understand machine performance. For example, comparing the number of errors generated from a given machine with the average number of errors generated by similar machines, may indicate the machine is due for servicing. In these scenarios data from other accounts may be presented in an anonymized format.

Figure 5:
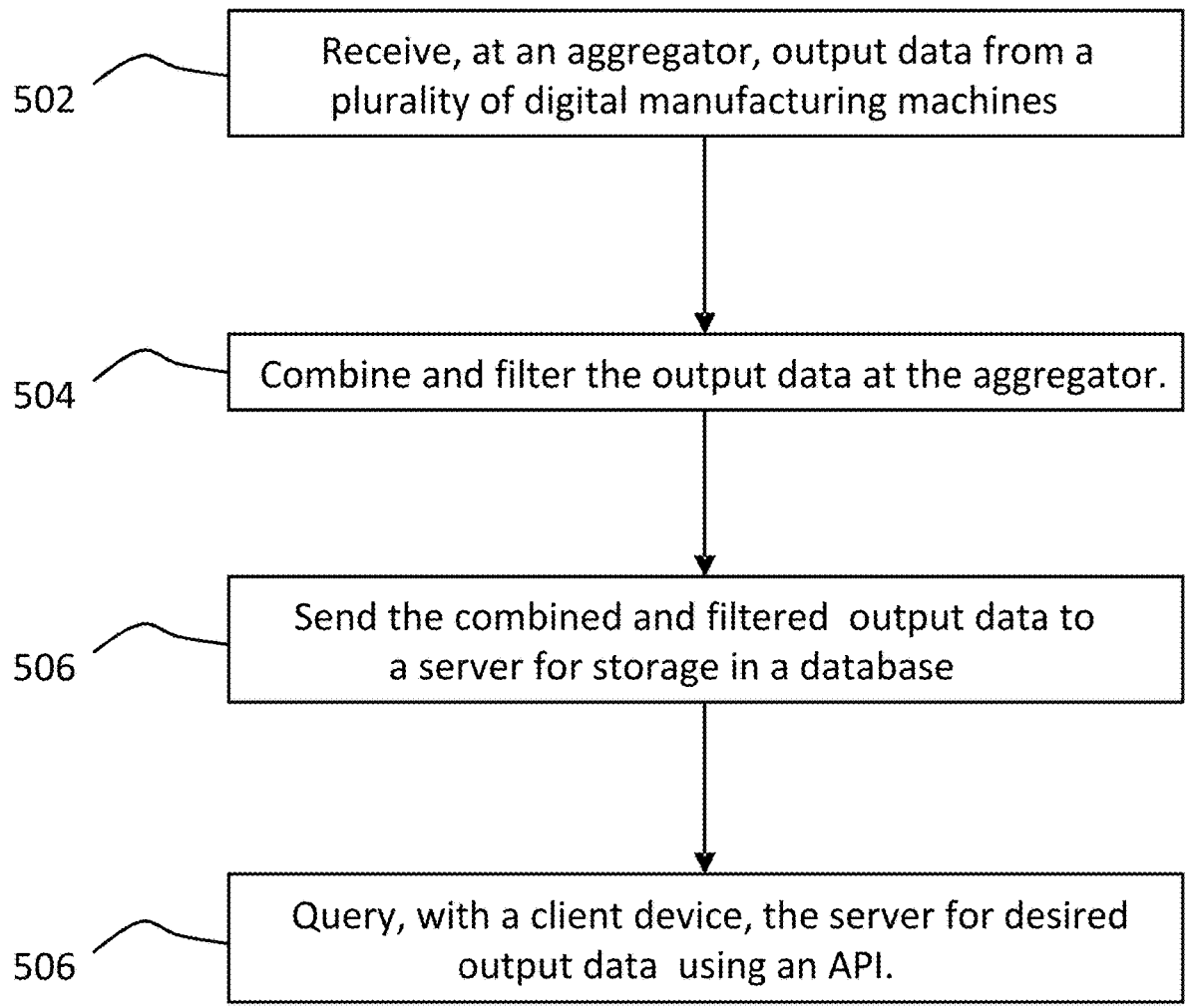
FIG. 5 shows a flowchart of a method for aggregating and analyzing digital manufacturing data.

FIG. 5 depicts a flowchart of a method 500 for aggregating and analyzing digital manufacturing data, in accordance with some embodiments. At step 502, an aggregator receives output data from a plurality of digital manufacturing machines. The data may be received at communications circuitry, such as a network interface card (NIC) or other wired or wireless. These digital manufacturing machines (e.g. machines 102 of FIG. 1) may be used to manufacture a product using a digital manufacturing process. Generally speaking, the machines can fall into one of four categories, additive tools, subtractive tools, finishing tools, and measuring tools. Each machine is configured to receive input data that contain instructions regarding how to process the product. Each machine also generates output data that can include, for example, physical measurement data of the product, attributes of the machine itself, and/or information describing the machine.

At step 504, the aggregator combines and filters the output data received from the digital manufacturing machines. Combining the output data can include receiving data from several different digital manufacturing machines, and filtering out unnecessary data, and concatenating the filtered output data for transmission to a server. At step 506, the filtered output data is sent to the server for storage in a database.

At step 508, a client device queries the server for data stored thereon. For example, the client device can request, via an API stored thereon, historical data for a particular machine, real-time data for all running machines, and any combination of the above.

The systems described herein, or portions thereof, can be implemented as a computer program product or service that includes instructions that are stored on one or more non-transitory machine-readable storage media, and that are executable on one or more processing devices to perform or control the operations described herein. The systems described herein, or portions thereof, can be implemented as an apparatus, method, or electronic system that can include one or more processing devices, parallel processing devices, and memory to store executable instructions to implement various operations.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

Figure 6A:
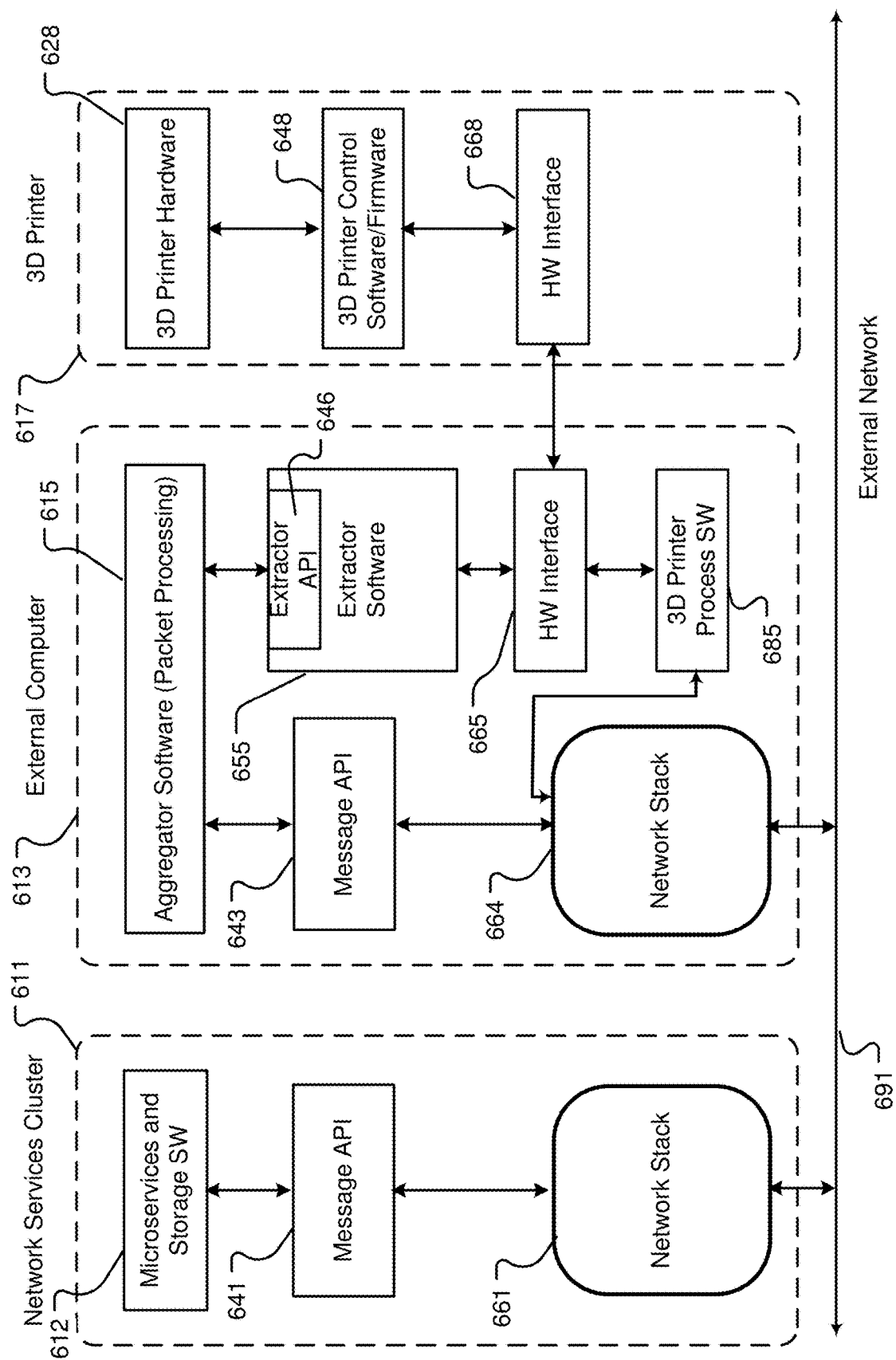
FIG. 6A is a block diagram of a system architecture that encompasses and harmonizes the shared functionality embodied in the examples given in FIGS. 7A-9B.

FIG. 6A is a block diagram of a system architecture that encompasses and harmonizes the shared functionality embodied in the examples given in FIGS. 7A-9B, which are drawn to emphasize the commonality among these three systems, while utilizing different data extraction modules for their respective 3D printers. When implemented in a multivendor 3D printing facility, this architecture enables useful 3D printer data, including printer and job status, to be uploaded to a network where it may be presented to users having access to the network. Further, providing such data in a canonical format enables a user to view and interact with it using a common user interface instead of piecemeal, using separate software and user interfaces for each manufacturer or printer.

The technology disclosed herein, including this architecture, provides a system that can extract 3D printer data, transform it into a canonical form and upload it to a network-based database for further analysis and processing. The extraction process begins by capturing raw data that flows to and from the printers. If the raw data stream is accessible via USB or a TCP/IP interface as in FIGS. 7A, 7B, 9A and 9B, "sniffer" software like Wireshark (https://www.wireshark.org/) can be used with an appropriate plugin module, USB or TCP/IP in these examples, to capture the raw data. If the raw data stream is not accessible and the data is stored in a local database as in FIGS. 8A and 8B, then an appropriate database interface, ODBC/JDBC (Open DataBase Connectivity/JAVA DataBaseConnectivity) in this case, can be used to retrieve the data from the database.

The data of particular interest for 3D printers includes information regarding printer status, job status, material status and events. This data is extracted from raw captured data. As an example, for TCP/IP, the header and trailer bytes would be removed to reveal a payload that contains printer specific information.

For explanatory purposes, these modules shown in FIG. 6 are collected into three groups. Group 611 comprises a network services cluster to which an aggregator 615 can upload machine data for storage, analysis and reporting. Further, the network services cluster 611 allows an application or service to communicate, via an aggregator 615, to a 3D printer 617 in this example.

Group 617 comprises a 3D printer system including its hardware 628, controller or embedded computer and associated firmware and/or software 648 and its hardware interface 668. In this example, its hardware interface 668 is shown connecting to a corresponding hardware interface 665 residing on an external computer, shown as group 613. The hardware interface 665 interacts with extractor software 655 to allow it to "listen" to or "snoop" on data communications to and from the 3D printer control software 648, and optionally to send commands to the 3D printer 617. The commands can be used to retrieve status information from the 3D printer. See the description of FIG. 8A for an example of how 3D printer status can be retrieved from an internal IBM DB2 database 857 by sending an SQL query across a serial interface 876 and 877 that connects an external computer 713 to a 3D printer 617.

In some configurations, the hardware interface 665 may also act as a communications path for custom or proprietary software 685 to communicate with both the 3D printer 617 and the network services cluster 611. In either case, the extractor software uses the hardware interface 665 to access detailed, low-level 3D printer communications data, much of which would otherwise available. It is this data that can provide extensive performance and status information that can help users to utilize their printers more effectively. Material status, job status and printer status are examples of some of the data available. Once extracted, this data can be transformed into a canonical form and uploaded the network services cluster 611.

Figure 7A:
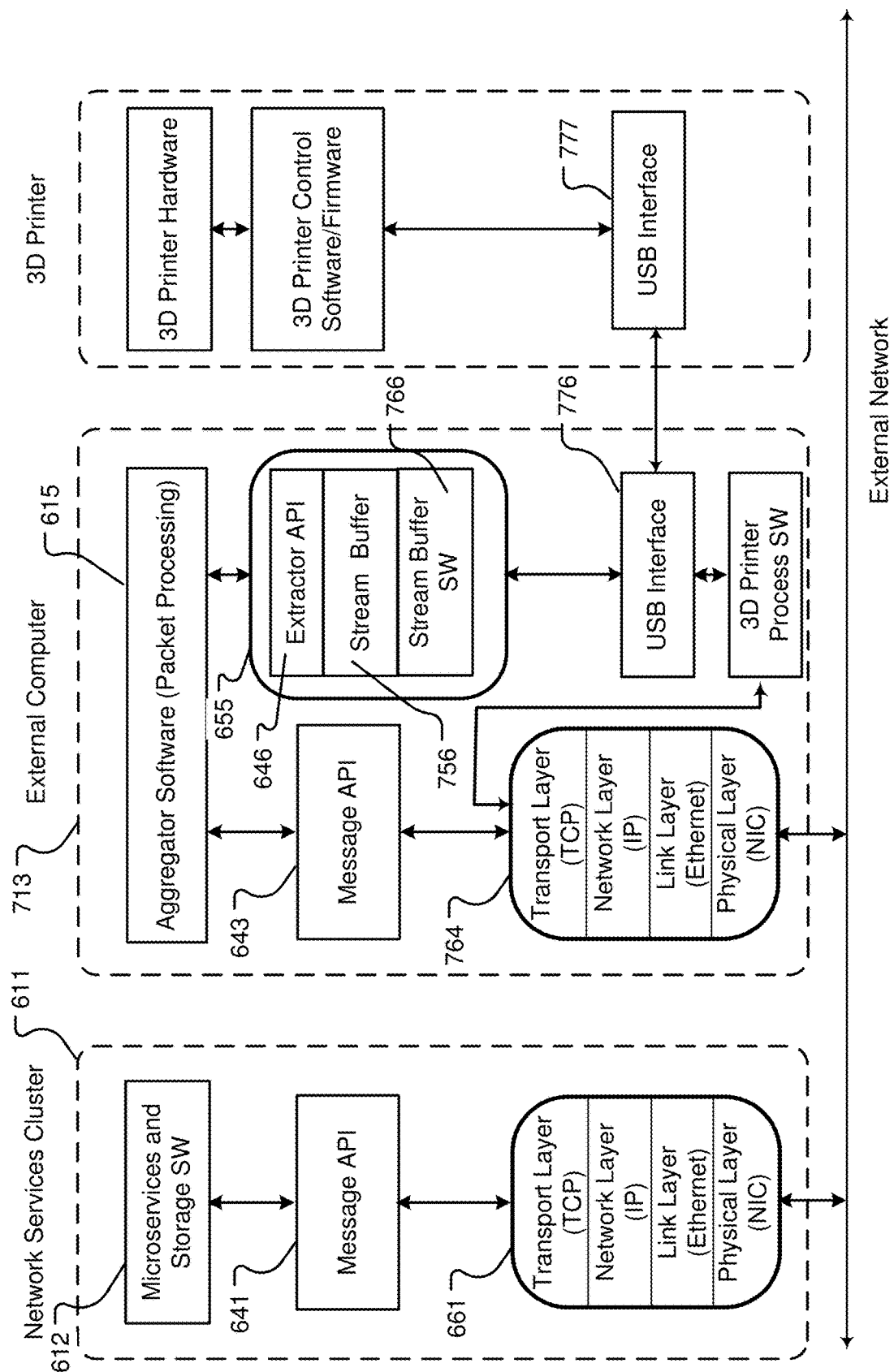
FIG. 7A is an example of an implementation of the architecture shown in FIG. 6A for use with USB interfaces.
Figure 9A:
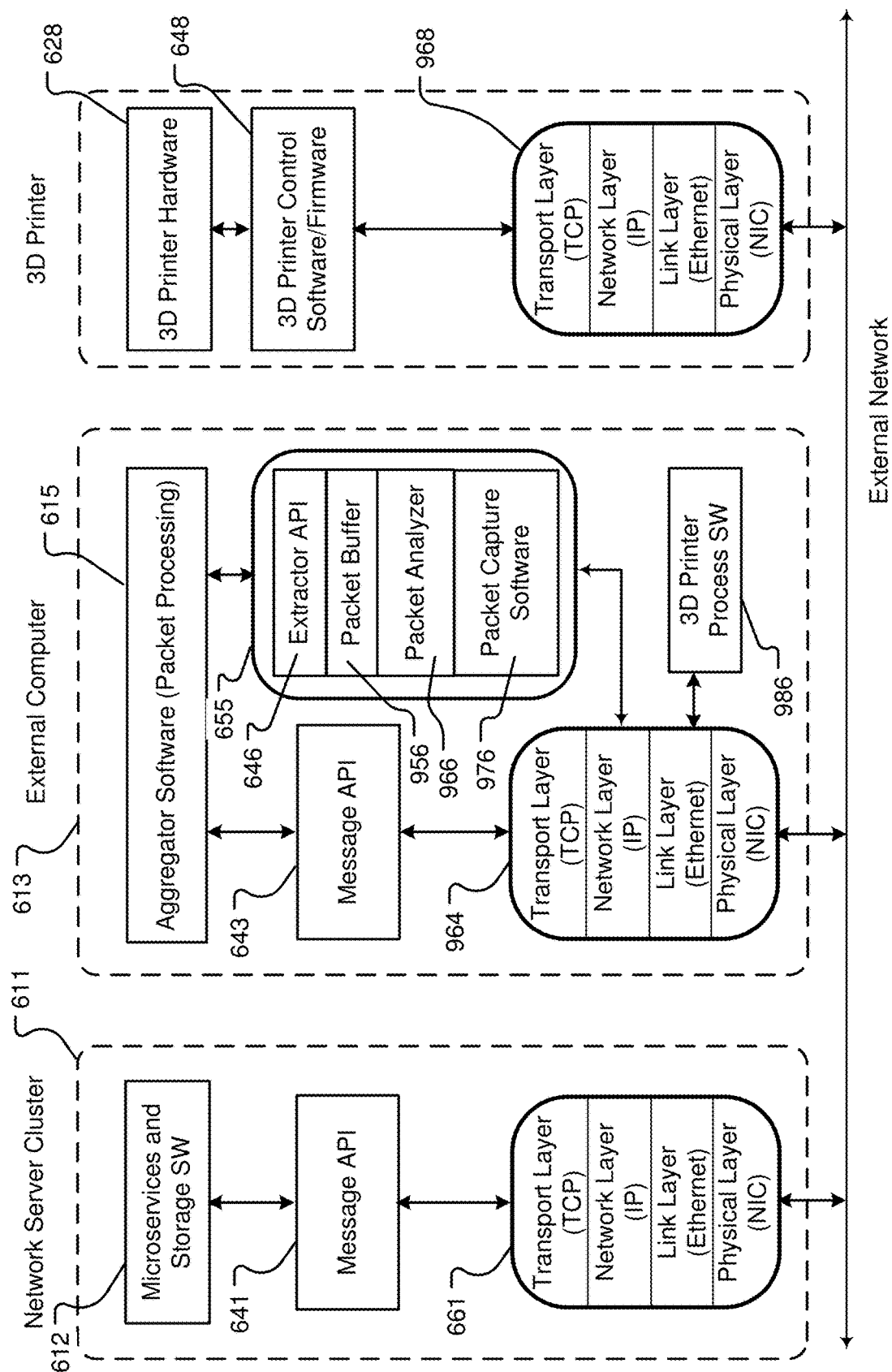
FIG. 9A is an example of an implementation of the architecture shown in FIG. 6A for use with TCP/IP interfaces.

The first process in data extraction is to capture raw data from sources that contain the data of interest to be extracted. For example, data of interest can often be encapsulated as a payload within a larger packet as in TCP/IP. Specialized software, e.g. Wireshark (https://www.wireshark.org/) can be used to capture such packets, after which the payload can be extracted for further processing. FIG. 9A shows an example of this in which the payload is 3D printer data. FIG. 7A also includes packetized data, but the encapsulation is based on USB (universal serial bus) protocol, not necessarily TCP/IP protocols.

Figure 8A:
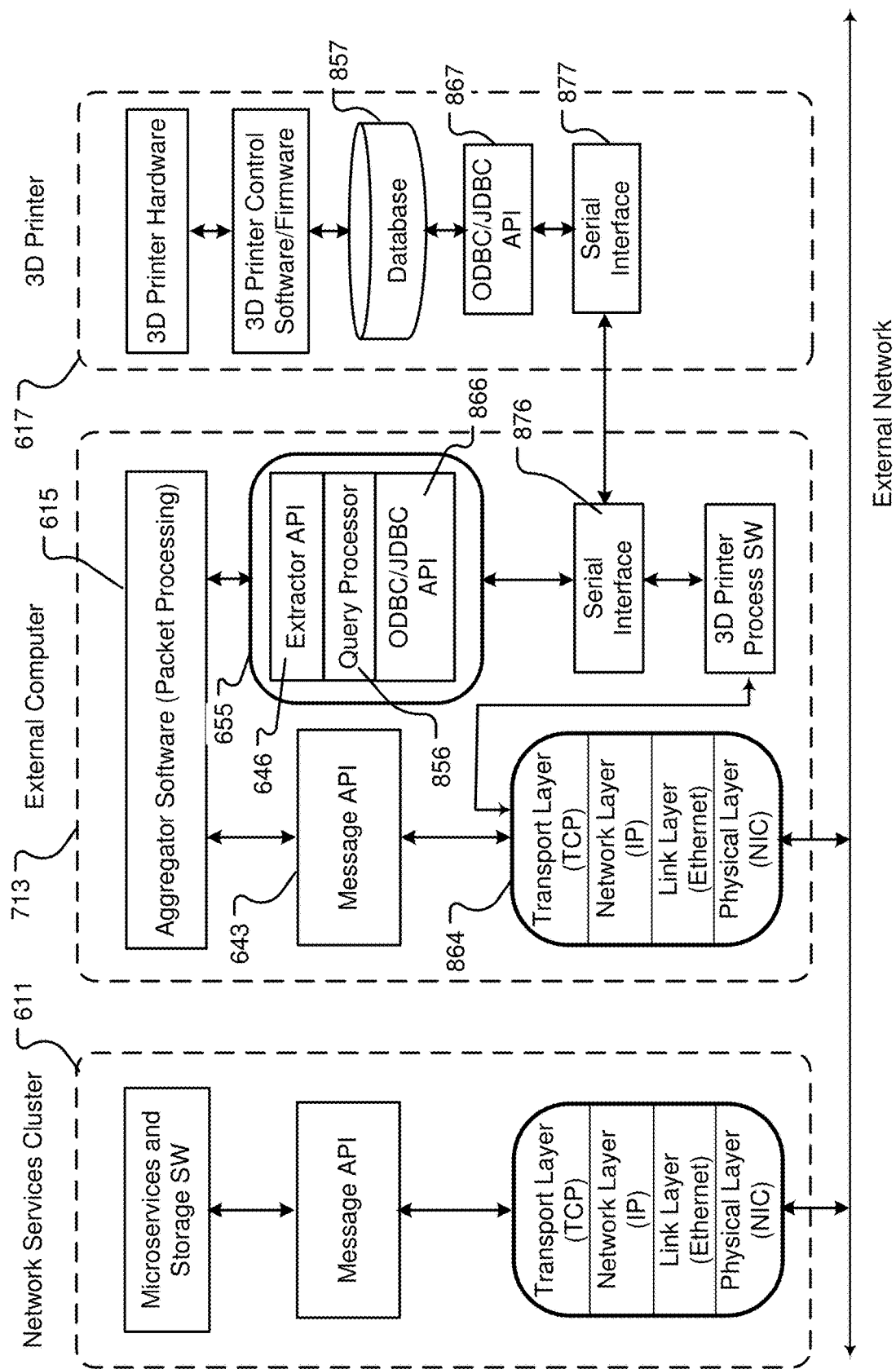
FIG. 8A is an example of an implementation of the architecture shown in FIG. 6A for use with ODBC/JDBC interfaces.

Data may be captured in other ways as well. For printers that store their data in a local database, data can be collected from the database by issuing database queries when particular database tables are updated with new data. FIG. 8A shows an example of this approach. Further details are provided in the descriptions for FIGS. 7A, 8A and 9A which show three different implementations of the architecture shown in FIG. 6A. In these cases, the aggregator software 615 can be the same, as can be the message APIs (application programming interfaces) 641 and 643, the microservices and software storage 612 and the network stack 661. This provides a more consistent and manageable implementation, although changes can be made while retaining the consistency of the overall architecture.

For instance, depending on the configuration of the external computer 613, the network stack 661 may be different. In most cases, the 3D printer 617 and its corresponding 3D printer hardware 628, software 648 and hardware interface 658 will likely be different for different 3D printers. The overall architecture is consistent, however, and thus allows for scaling a manufacturing facility to include many different types and numbers of 3D printers.

The architecture is designed to handle this type of networked multi-vendor 3D printer environment. While almost every industrial or commercial 3D printer manufacturer can provide propriety software to control their printers, when this software is concurrently installed and executing on the same computer, conflicts can and do occur. Further, much of the proprietary software has installation and operational restrictions that make it impractical to do so in many cases.

As can be seen in the examples shown in FIGS. 7A-9B, each specific make and model of 3D printer may have its own control and monitoring software. Such software is usually designed by the manufacturers of the printers and is not compatible with printers made by other manufacturers, or in some cases even with different printers made by the same manufacturer. In a heterogeneous commercial 3D printing environment, this presents a significant process management problem owing to the large variety of 3D printers that may in concurrent use.

A further issue posed by printer specific monitoring and management software is that its capabilities to fully manage specific printers are often restricted to a computer located in close physical proximity to the printers. Other restrictions may be imposed as well for monitoring software installed on a remote computer. As an example, discussed in FIG. 9B only a single client computer may be able to monitor a specific 3D printer. Although this can be an arbitrary restriction imposed by the software or the manufacturer, one practical reason for this stems from the real-time nature of the 3D printing process itself and its demands on a controlling computer or controller.

The nature of real-time processes, like 3D printing, is that code that executes on a real-time controller or computer should not affect time critical control processes that may be executing. Such processes, in a 3D printer, may be controlling the speed and position of the print head or nozzle, the flow of material, the temperature of the printer components, etc. If delayed by another process executing on the same computer, flaws in the 3D printed part can occur. In some cases, the 3D printer control software itself may fail completely. Thus, there can be a conflict between collecting status and performance data to oversee and improve a 3D printing process versus introducing execution latencies in other software that is performing time critical control processes.

If such data can be collected and sent to a network services or database with minimal or no interference to ongoing real-time control processes, this can provide valuable information to users of 3D printers and other similar digital manufacturing machinery. Further, if the collected data and resulting information derived from it can be made widely available on a network to multiple users in multiple locations, this would be highly desirable. The architecture described in FIG. 6A and the remaining technology disclosed herein can provide these capabilities. Several examples based on real-world testing are described herein are provided to illustrate the importance and value of this technology.

Note that in order to provide these capabilities, aggregator software 615 effectively communicates directly or indirectly with a computer that is running real-time software that controls or manages part of an active 3D printing process. In practice, aggregator software is often installed on a workstation that is physically attached to its 3D printer(s) so that it can have access to either the network interface used by the 3D printer or to its internal database where status, job and event data are stored. Thus, aggregator software should not to interfere with real-time processes critical to operation of an attached 3D printer. Further, since the aggregator is designed to communicate extracted and transformed data to an external network, it should minimize its responses to any communications not intended for printers to which it is attached.

Figure 6B:
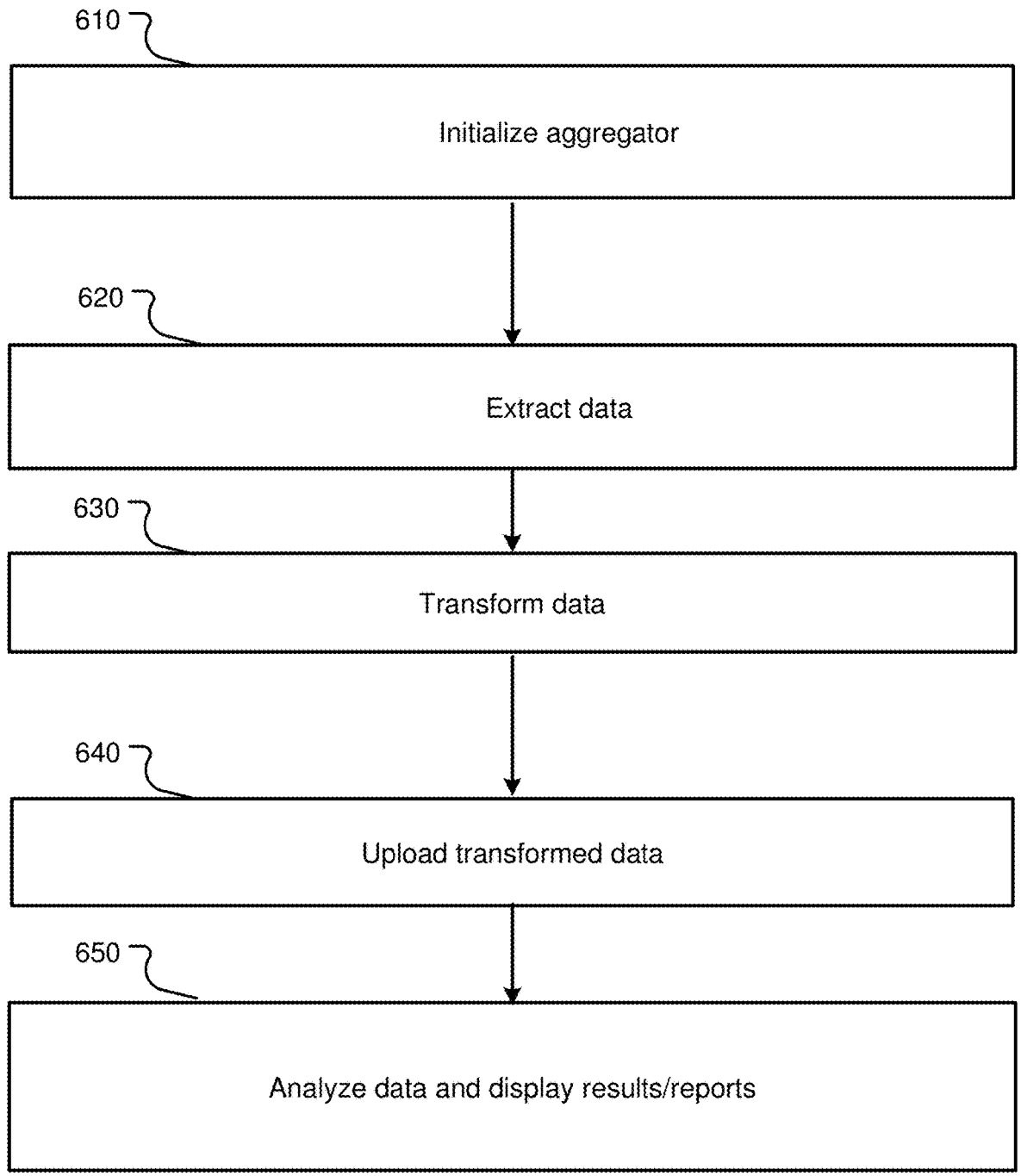
FIG. 6B is a high-level flowchart that shows how captured data undergoes a process analogous to ETL, or extract-transform-load, in order to make it available via a network to many users both local and remote.

FIG. 6B is a high-level flowchart that shows how captured data undergoes a process analogous to ETL, or extract-transform-load, in order to make it available via a network to many users both local and remote. During initialization of the aggregator 610, extractor software including specific data capture modules can be loaded and initialized. At this time, the aggregator and the extractor software will be configured to collect data from the printer via polling or streaming and listening. The data transfer between the aggregator and the extractor software can also be configured to use a polling interface driven from the aggregator or a callback interface driven by the extractor.

In some of the test cases performed using the technology disclosed, the extractor software loaded Wireshark (https://www.wireshark.org/), a widely available open source protocol analysis tool, along with specific packet capture modules to capture packets of raw data flowing to and from a printer. In other test cases, the extractor loaded ODBC/JDBC interface software along with polling software to manage the data gathering process from database tables maintained internally within a 3D printer.

After initialization at 610, the extractor can set data capture processes to run automatically. If polling is used, as in the database example shown in FIG. 8A, then queries can be made at desired intervals to a database containing the 3D printer status data. If streaming and listening are used, then data packets can be captured and buffered as they stream to and from a 3D printer.

At 630, an extractor 655 can then extract printer specific data from the captured data as desired without interfering with the data flowing to and from the 3D printer. As an example, if a payload comprising printer data has been encapsulated within a TCP/IP packet then it can be "decapsulated" by removing control bytes (e.g., headers and trailers) that surround it.

The extracted printer data can then parsed, decoded and transformed at 630 into a canonical format by the aggregator software 615. A simple example of decoding is the extraction of raw printer data from a base-64 encoding, an encoding that translates binary data, in this case printer data, into ASCII text characters. This is done to ensure that data is not inadvertently modified when sent using data transport protocols that are designed only for text. Some of the data comprises control sequences and other data can indicate various status conditions or material related information. In addition to decoding printer data from encodings like base 64, the data may require further parsing, decoding, reformatting and translation to transform it into a canonical format for analysis and reporting. FIGS. 10-17 show several examples of the transformation process.

Lastly, the transformed data is uploaded at 640 to the network services cluster 611 for storage and further analysis and processing at 650. In some implementations, both the raw printer data and the transformed data may be uploaded. Network stacks 664 and 661 in conjunction with message APIs 643 and 641 provide the necessary communications protocols and connectivity. The microservices and storage software 612 provide the data store, as well as several other services shown in FIG. 18. Data from many different printers can be collected using this process and made widely available for use by other users and other software.

FIG. 7A is an example of an implementation of the architecture shown in FIG. 6A for use with USB interfaces 776 and 777, corresponding respectively to hardware interfaces 665 and 668 in FIG. 6A. This is the simplest example given and in most cases, when the 3D printer is driven directly from a controlling computer, its USB data stream cannot tolerate interruptions as the printer buffers may not be large enough to continue supplying job data to the printer hardware and firmware/software. If the data stream is interrupted, there is a risk that an in-process print job will be negatively impacted. Alternatively, if a job is not interfaced to a network and is driven solely from a micro SD or other type of local digital media, then the only way to obtain printer and job status, including material status, is to physically observe the printer. This is not practical in a multivendor 3D printing facility having more than a few printers.

Continuing with this example of a 3D printer having a USB interface, like the Monoprice Select Mini 3D in FIG. 7B, the extractor 655 uses stream buffer software 766 to capture raw data into a stream buffer 756. In one implementation, the extractor 655 can be polled by the aggregator software 615 at intervals determined by the aggregator 615. Since the aggregator 615 is in control, no data throttling is needed. If no data is ready, the stream buffer 756 may provide no data, or provide data previously sent.

In another implementation, the extractor 655 can communicate with the aggregator software 615 via a callback that is established at initialization time. In this case, the aggregator 655 can throttle the data rate if necessary, to avoid overloading the aggregator stack. For consistency among different implementations, the extractor API 646 can be provided as a standard interface to the aggregator software 615. Further, it can be the same for all implementations, including those shown in FIGS. 7A, 8A and 9A.

FIG. 7B is a picture and product overview diagram of a Monoprice Select Mini 3D printer that uses a USB interface. Its corresponding micro USB connection port is shown at 755. If the printer is being driven by a job that has been downloaded to a microSD card and inserted into the printer, there need be no connection to the USB interface. One downside to this is that the machine is running standalone and monitoring status of the machine, including material usage and overall printer operation, would be performed visually by inspection: an operator or user physically present observes the machine.

In a 3D printing facility with many printers but without digital communication to the printers as in this example, this would require a person, perhaps walking around with a clipboard in hand, to physically check on each printer and record its status manually. In the earlier days of 3D printing, printers were often run standalone and this manual process was the only way to get updated status information. Consequently, owing to the inconvenience, it was not done often, even at commercial facilities. Even today, with most commercial printers integrating computers or workstations in close physical proximity, the situation is only somewhat improved as will be seen in the examples given in FIGS. 8A-9B.

For the Monoprice and other similar USB 3D printers, freely available software like Cura (https://ultimaker.com/en/products/cura-software) and Octoprint (http://octoprint.org/) allow jobs to be run directly from a controlling computer and can retrieve in-process status information. However, since the buffer in the printer itself may only hold a few hundred bytes, if the computer feeding the USB stream is unable to keep the printer buffer adequately filled, the stream of gcode that supplies the low-level instructions to the printer may be interrupted, resulting in flaws or failure of an in-process 3D printing job.

For basic 3D printers having USB interfaces like the one shown in FIG. 7B, data capture can be done using the USBPcap open source USB data capture driver (http://desowin.org/usbpcap/) in combination with Wireshark (https://www.wireshark.org/), an open source network protocol analyzer. Many other USB capture drivers and software packages are readily available and can be used to implement the technology disclosed.

In some implementations, it may be necessary or desirable to include a hardware based USB capture device; for instance, with an embedded system that cannot run a software-based solution. The only requirement is that the extractor 655 feeds its extracted data to the aggregator 615. The interaction between the aggregator 615 and the extractor 655 can be defined during initialization at boot time, when the operating system is started.

In one configuration, an aggregator loads Wireshark as the stream buffer software 766 during initialization and makes an initial call to it. Wireshark then responds with one of two choices: it can choose to have the aggregator poll it, or it can perform a callback to the aggregator at specified intervals. In either case, the raw printer data can be extracted from the data captured by Wireshark and fed to a stream buffer 756. This buffer can then be read by the aggregator 615 at specified intervals or by polling using the extractor API 646.

The aggregator 615 then transforms the raw printer data as shown in the examples in FIGS. 10-17. In these examples, the raw printer data is decoded, parsed and reformatted into JSON (JavaScript Object Notation) and subsequently uploaded to a network services cluster 611. In an alternate implementation, XML (eXtensible Markup Language) notation can be used to reformat the data. JSON and XML can be used in this implementation to "serialize" the data so that it can be uploaded in a linear form as text or binary data. There are several other data serialization formats as given in the examples here: https://en.wikipedia.org/wiki/Comparison_of_data_serialization_formats.

FIG. 8A is an example of an implementation of the architecture shown in FIG. 6A for use with ODBC/JDBC interfaces 866 and 867 which work with serial interfaces 876 and 877 that correspond, respectively, to hardware interfaces 665 and 668 in FIG. 6A. The difference in this example is that the raw data to be captured resides in a database 857 situated within a 3D printer, often on its embedded computer as with the EOSINT M280 in FIG. 8B. The challenge is how to detect events that occur on the 3D printer and retrieve data that may correspond to those events, or to retrieve data that describe the status of a job that may be running on the printer, the status of the printer, or the status of the material in use by the printer.

In this example, detecting events and obtaining status information can be accomplished by monitoring changes in the state of database tables containing data that is relevant to events and statuses. The state of the tables is monitored via a polling loop that queries the tables at intervals of approximately a minute to determine if the length of the table or specific contents have changed. If so, then one or more queries are issued to the database 857 using the ODBC/JDBC API 866 and the serial interfaces 876 and 877 to retrieve the relevant data, which may include the entirety of one or more tables. Using a polling interval of approximately a minute significantly reduces the demand for computing resources that may impact real-time processes critical to the operation of a 3D printer.

In another implementation, a trigger can be implemented to fire on a particular insert, delete or update operation on a table. An action corresponding to a trigger can include a list of SQL statements to be executed, including one or more queries to obtain the relevant data. SQL is "structured query language," a computer language used to retrieve data from relational databases like IBM DB2. An example of SQL is given in 1025 of FIG. 10.

Once the one or more queries are executed, the returned data can fed from the ODBC/JDBC API 866 to the query processor 856, and thence to the aggregator 615. Note that in this example, query commands are sent to the 3D printer to retrieve the desired data. This differs from the examples shown in FIG. 7A and FIG. 9A, in which the desired data can be obtained by capturing portions of data streams.

FIG. 8B is a picture and product overview of an EOSINT M 280 3D printer 857. This printer stores its status data in a local database as per the architecture outlined in FIG. 8A. A general description is given in the text in 822, and a detailed description of the required process computer and process software is given in 852. Specifically, the process computer is integrated into the cabinet of the 3D printer and the display 859 is visible.

This 3D printer integrates a workstation computer running a version of Microsoft Windows 895. Almost all commercial and industrial 3D printers available at the time of writing use a version of Microsoft Windows for their workstation software. One rationale for this is that most CAD/CAM software used to create the 3D models to be printed runs on Windows, so it makes sense to be compatible with this platform.

Most commercial 3D printers available today include their own workstation or embedded microcontroller. Their manufacturers also typically provide proprietary software to manage and monitor these printers, again usually designed to operate on Microsoft Windows. This software is usually designed, as in this case, to be run on the workstation as a printer-server that is integrated with the 3D printer or a specific remote computer onto which the software must be installed.

The result is that the detailed job, status and event data and information that describe the state of a 3D printer, including its current jobs and materials, are only available at the printer-server workstation or at specific remote computers, usually via a touch screen or other graphical user interface. Again, an operator must be physically present to retrieve this information using the workstation GUI (graphical user interface). In some cases, remote monitoring software is available. However, even that provided by a manufacturer, is usually only able to retrieve some of this information and can often only communicate with specific printers whose jobs it manages. Again, this makes it difficult or impossible to remotely monitor detailed 3D printer activities, from more than a few specific workstations which already have specialized or proprietary software installed.

Once 3D printers from multiple vendors are being operated on the same network, it becomes difficult to view and control any or all of the printers from a single remote or client workstation on the network. Part of the difficulty is that software from different manufacturers may not be compatible on the same host computer. It may only be possible to run one set software at a time and in some cases the installation of incompatible software may preclude running any of this specialized software at all.

Another contributing factor to scaling up a facility to handle multiple printers from multiple vendors can result in a significant increase in network traffic as the printers talk to computers that are monitoring and controlling them via the network. This additional traffic can impact the performance of computers on the network that are managing 3D printer jobs. In some cases, a 3D printer may unintentionally receive a message that it cannot handle and this message may interfere with in-process jobs.

The technology disclosed herein overcomes this problem by creating a private line or virtual private channel for any given printer that allows detailed 3D printer data to be collected, transformed into a canonical format and uploaded to a network location. Aggregator 615, extractor 655 and upload 643 software as shown in 713 of FIG. 8A can perform these tasks when installed on a printer workstation or server which has access to detailed 3D printer activity data, including job, status and events. This software can be run on a Microsoft Windows operating system and that is the operating system used on the workstations and printer-servers used on most commercial 3D printers currently. In alternative implementations, the software may be run on a Linux, UNIX, Mac or other operating system.

The EOSINT M 280 process computer runs a Microsoft Windows operating system and uses an IBM DB2 database to store all data relevant to the state of the machine. Further, a physical serial interface is provided to allow external access to the DB2 database. In FIG. 8A, this corresponds to serial interface 877. The DB2 database corresponds to 857.

Since the workstation integrated with the EOSINT M 280 runs Microsoft Windows and includes an Ethernet interface, an aggregator and its accompanying software can be installed on it. Further, since this 3D printer also provides an ODBC/JDBC interface in its workstation, the aggregator 615, via the ODBC/JDBC API 866, can issue queries to the internal IBM DB2 database 857 in order to monitor and retrieve the state of the 3D printer. FIGS. 10, 11A and 11B provide additional implementation detail on this process. Subsequently, the aggregator 615 can use the message API 643 and the workstation network stack 864 to upload its results to the network services cluster 611.

FIG. 9A is an example of an implementation of the architecture shown in FIG. 6A for use with TCP/IP interfaces 964 and 968 which provide data communications between the printer-controller 648 and a printer-server 986. In this implementation, TCP/IP network stacks replace hardware interfaces 665 and 668 in FIG. 6A. The raw data can be captured into a packet buffer 956 using packet analyzer software 966, and packet capture software 976. In this implementation, Wireshark software and a Wireshark WinPcap packet capture plugin are used to capture data packets as they stream across the TCP/IP interface. The extractor 655 extracts the raw printer data from the packets and transfers this raw printer data to the aggregator software 615.

In one implementation, the aggregator software 615 polls the extractor 655 at intervals to read the incoming data. The intervals can be determined by the aggregator, and since the aggregator is in control, no data throttling is needed. If no data is ready, the either no data is read or previous data can be returned.

In another implementation, the aggregator software 615 can be called via a callback that is established at initialization time between the aggregator 615 and the packet extractor software 655. In this case, the aggregator 615 can throttle the data rate if necessary to avoid overloading the aggregator stack. For consistency among different implementations, the extractor API 646 is provided as a standard interface to the aggregator software 615, and can be the same for all implementations, including those shown in FIGS. 7A, 8A and 9A.

FIG. 9B shows a picture of an Objet1000 Plus 3D printer system manufactured by Stratasys, Inc. It also shows a physical description and some information about the job manager software provided as part of the Object Studio software by the manufacturer. The characteristics of this system exemplify some of the current features and limitations of currently available commercial and industrial 3D printers.

The Objet 1000 Plus includes a printer-server and a printer-controller, each on their respective computers that communicate using TCP/IP over Ethernet. Jobs are sent to the 3D printer via the printer-server, which determines when to forward data to the printer-controller.

As is the case for many of these printers, the printer computer 909 and printer server 919 are built into the printer as shown. The job manager 950 uses a different screen (user interface) if installed on a client workstation as per 969. To view status information for all jobs sent to the 3D printer and edit them, the job manager must be viewed on the directly-connected computer (server) 979.

For a copy of the job manager installed on a client computer 989 the job status information is only available for jobs sent from that computer, and only these job s can be manipulated and edited. Further, although client computers can connect to different 3D printers, only one 3D printer connection can be maintained at a time in order to use the job manager for that 3D printer. Thus, if a user wishes to view information on all jobs for a particular printer, he must use the job manager on the printer-server or workstation for that printer. In a 3D printing facility with multiple heterogeneous 3D printers, this is at a minimum inconvenient and increases the overall management effort and time required to oversee multiple printers. In some cases, if software packages from multiple manufacturers are running, they may interfere with each other to varying degrees and possibly impact jobs running on some printers.

These, and similar restrictions on the use of available 3D printer monitoring software, whether supplied by a manufacturer or a third party, create operational obstacles to managing multiple 3D printers. The technology disclosed herein effectively remedies this problem and enables multiple different or similar printers to be monitored via a network from anywhere on the network.

FIG. 9C shows a picture of a Stratasys Fortus 900MC 3D printer system, also manufactured by Stratasys, Inc. Like the Objet1000 in FIG. 9B, the characteristics of this system exemplify some of the current features and limitations of currently available commercial and industrial 3D printers.

The software supplied by the manufacturer is called Insight™ 917. It is installed on "a generic computer workstation" 927 that acts as a printer-server and runs a Microsoft Windows operating system 987. Job files are processed on the workstation 927 and sent to the 3D printer system from the Insight application 957. They are transferred via an Ethernet network from the workstation's Ethernet interface 997 to the Fortus system's onboard computer 977 through an RJ45 network connector 967. The onboard computer is physically integrated into the 3D printer system. It is the central control unit for the printer 977 and runs its touchscreen 937 through which an operator can monitor and control the system.

An aggregator runs on the same workstation as the Insight software that builds and downloads jobs. Being positioned at this point allows it to listen to or snoop on all communication between the workstation and the onboard computer. Packets can be captured, raw printer data can be extracted and an aggregator can transform this data into a canonical form that can be uploaded. Raw printer data can also be uploaded. The architecture is the same as that of the Objet1000 shown in FIG. 9A. Two network interface cards (NICs) are used in this configuration: one to connect the workstation to an Ethernet network and another to connect the onboard computer to the Ethernet network.

The manufacturer does provide complete control of the printer and jobs using the touchscreen interface 937 controlled by the onboard computer 977. Some remote monitoring capability is provided through a web-based control center interface. This is of course not in a canonical form that can be combined and displayed in a uniform fashion with data from other printers. However, by monitoring communications between a workstation and an onboard computer, an aggregator can upload printer data continuously and efficiently for further analysis, reporting and display to any user having access to its network.

The previous figures have described the overall architecture and rationale supporting the value and usefulness of the technology disclosed herein. Various example implementations have been presented for different types of 3D printer interfaces, and images of actual 3D printers exemplifying these interfaces have been presented. The characteristics of these printers and their limitations have been discussed in light of the technology disclosed. Samples of working code, data structures and data transformations will now be presented.

FIG. 10 is a sample of working code that is designed to poll an internal IBM DB2 database included with the EOSINT M280 shown in FIG. 8B. An EOS background polling service is started at 1025 to monitor an EOS printer if an EOS database is found. At 1055, a trigger is added to the EOS database. Alternatively, a database trigger can be used to monitor changes in the database is an efficient way to detect these changes.

At 1075, a detailed SQL (structured query language) query is issued to the DB2 database to retrieve job information within a given period. This query is run in a loop at polling intervals of approximately one second to avoid overloading the DB2 database with unnecessary queries.

FIGS. 11A-11B show database schemas for some of the tables that can be retrieved from the EOSINT M280 3D printer. In the first table 1111, various job parameters are given in XML format. The timestamp field JP_TIMESTAMP shows a date 1112 of 2016-07-03 11:34. Descriptive text follows in the JP_TEXTDATA field: this is a long directory path 1113 that includes descriptive job information. A part identifier PT_ID 1114 is shown next. The last entry is a job identifier 1115 which can be used to reference other database tables related to the same job.

The second database table 1151 contains time information for an individual job, again using the job identifier JO_ID field to act as a key that allows a relation to be established among the many tables that pertain to a given job.

The job parts information table 1171 contains binary data related to parts as shown in the JPI_PARTSDATA field. The job identifier field JO_ID can be used as a relational key. The jobs table JOBS_TBL 1121 in FIG. 11B shows how the job identifier JO_ID is used to join information from a particular job, like the job filename JO_FILENAME given as a directory path, to information in other tables.

The parts table PARTS_TBL 1141 shows several parts dimensions and other parameters that are later used to calculate parts information to be uploaded to the network services cluster. Some of these indicate minimum and maximum part dimensions: P_MINX, P_MINY, P_MINZ, P_MAXX, P_MAXY and P_MAXZ. FIG. 16 shows how these values can be used to calculate values for width, height and depth in a canonical format that can be uploaded.

FIG. 12A shows example code that starts the listening process 1211 for an Objet printer. At 1231 the Object packet capture process is started. At 1253 the connection to the printer is verified and logged as the Objet listening state. Once the printer is in the listening state, any packet received is parsed at 1273. If the packet has been parsed it is logged and the command is checked at 1295. If the command is to stop, end, start or resume a job, then the Objet log files are set to be polled for changes 1297. Lastly, the packet event type is set to "packet" and the parsed packet is added to the packet capture buffer at 1299.

FIG. 12B shows example code that starts and stops background polling for an Objet printer. Polling for the Objet printer is started at 1202. if successful, a new printer event buffer is allocated at 1222. At 1242, logging is started. Similarly, to stop the background polling, the packet capture process is stopped at 1262, the logging is stopped at 1282 and the heartbeat is stopped at 1292.

Figure 13:

FIGS. 13-14 show code used by the extractor software for decoding an Objet printer packet and an example of a raw packet (in hexadecimal format), respectively. For explanatory purposes, the code in FIG. 13 will reference the packet in FIG. 14 and its decoded values. A summary table showing the bytes decode is given at 1400.

FIG. 14 shows a raw packet from an Objet printer displayed as an ordered table of hexadecimal numbers, often referred to as a "hex dump." A byte location in the table is found by proceeding down the column 1451 on the left side and then to the right. For instance the hex bytes 0x95-0x9d are underlined and indicated by 1485. They are found by going down column 1451 to the "0090" entry then across to the right to the "5" entry to reach the first byte at address 0x95. These bytes translate to a null-terminated ASCII string which reads "VeroBlue," 1489 referring to a photopolymer material used in 3D printing. The hex 0x00 at location 0x9d is the "null" (zero) that terminates a string in this format. A packet is decoded as follows.

In FIG. 13, at 1311 at hex value of 0x02 indicates the packet header of the packet which appears at byte location 0x00 at 1452. In FIG. 14, the address "Byte 00" is shown in the first row and first column 1411 of table 1400. The value of the byte is 0x02 shown in the "Hexadecimal" column 1412 of the table 1400. Its decoded value appears in the decoded column 1416. A short description appears in the description column 1417. Thus, a hex value of 0x02 is decoded as the packet header. The next byte at 1453 is 0x4f and according to the code at 1331, this indicates packet material information is to follow 1429 so the code jumps to the location indicated by 1341.

Proceeding to the code at 1352, it can be seen that a value for the tray rear offset is expected. This is read at 1355 and interpreted as a 32 bit or 4-byte unsigned integer with byte reversal indicated by the "LE" at the end of the variable type "readUInt32LE". It's hex value of 0x1a000000 is found at addresses 0x3 d-0x40. However, since this is byte reversed, it must be read as 0x0000001a which equals 26 in decimal. Therefore, this is interpreted as a tray rear offset of 26 mm. (millimeters). Likewise, at 1362, bytes 0x41-0x44 are the tray front offset 0x22000000 which equals 34 in decimal, or 34 mm. Bytes 0x45-0x48 at 1372 are the tray front offset 0x8d010000 which decodes as 472 mm.

Material information is given at 1382 and 1392. At 1382, the model resin 1 is at bytes 0x49-0x52 and decodes at 1459 as "VeroClear". At 1392, the support resin 1393 at locations 0x69-0x74 decodes at 1479 as "FullCure705".

FIG. 15 is a similar decoding of a Stratysys 3D printer packet capture. This packet contains information about part minimum and maximum sizes in three dimensions: X, Y and Z. A summary table at 1500 similar to that in FIG. 14 shows the decodings of the part minimum values for the X,Y and Z dimensions. The raw hexadecimal data is shown in the lines at 1561. At 1569, an ASCII translation of the bytes in the table is given. The names of the dimensions and their values are shown. Note that both minimum and maximum part sizes in the X, Y and Z dimensions are included. This information will be used in FIG. 16 to calculate upload values.

FIG. 16 shows code for calculating values in a canonical form to be uploaded from an aggregator to a network services cluster. Three values are calculated from the data gleaned from the printer data. Their canonical form is expressed as width, height and depth. In this case at 1615, width is calculated from the maximum and minimum part sizes in the X dimension. These values were used as examples in FIG. 15 at 1569, which shows how they were obtained from actual printer packets.

At 1666, height is calculated from maximum and minimum values in the Y dimension. At 1667, depth is calculated from maximum and minimum values in the Z dimension. The examples shown in FIGS. 13-17 illustrate a few of the many ways in which raw printer data can be transformed into a canonical form for upload to a network services cluster.

FIG. 17 is a stream of data in JSON format that was captured during testing. For ease of readability it has been shown as individual, indented lines. However, in actuality these are compressed by packing them together with no line breaks or indentation. JSON (JavaScript Object Notation) is a human readable data format often used as a simpler alternative to XML (eXtensible Markup language).

Visible in the JSON data are the job identifier at 1721 and the material units used at 1731 which indicates grams. Information on the amount and type of material consumed for support structures, and multiple model resins is shown at 1742, 1752, 1762 and 1772, respectively. The depth, height, name and width values of a part are shown at 1783, 1784, 1785 and 1786, respectively.

This JSON data stream is the result of capturing and extracting raw printer data, then transforming it into a canonical form through a process that includes parsing, decoding, calculations and interpretation to produce information describing the state of a 3D printer. This state includes printer status, job status, material status, events and other relevant information that can be extracted from the raw printer data. The JSON data stream is an example of the data collected and generated by the aggregator and its accompanying software, now ready to be uploaded via an appropriate messaging system to a network services cluster.

In order to provide the user of a 3D printer with the capability to manage multiple printers conveniently using a network infrastructure, the aggregator should have minimal or no significant impact on computer and network resources of the aggregator computer and accompanying software and hardware indicated in the external computer group 613 of FIG. 6. This is especially true for large scale facilities that run multiple heterogeneous 3D printers.

As described earlier and given specifically in the previous examples, industrial 3D printers in current use are designed to work with proprietary software provided by the printer manufacturers. The amount of work to configure and maintain a 3D printer facility long-term increases at least linearly or greater with the number of different 3D printer platforms that should be supported. The technology disclosed herein allows the interconnection of multiple printer vendors through a single harmonized set of APIs. Further, the technology disclosed can handle network accessibility, data analysis, and even bi-directional signaling between the printer and remote servers acting as overseers: for example, to park print jobs in a "safe" mode if a power interruption or earthquake is sensed.

In the following examples, which account for a significant proportion of the commercially available 3D printers, the detailed job control software is designed to run on a printer-server computer in close physical proximity and often physically connected to its printer. In many instances, the computer itself is enclosed in the same chassis as the printer. This is the case for the Stratatsys Fortus 900MC shown in FIG. 9C.

The remote management software provided by 3D printer manufacturers is limited in its capabilities. It can often only control jobs that it has submitted. In some cases, a 3D printer can only be connected to one remote computer. In other cases, it can only control a few 3D printers and they must be of the same kind.

These and other shortcomings of available 3D printer management software significantly limit the ability of a 3D printer facility to scale up to large numbers of printers of different types and multiple manufacturers.

Another significant problem that occurs when multiple printers, even of the same kind, are placed on the same network, is that the computing resources required to service messages on the network can increase to the point where they impact the operation of 3D printers connected to a computer that must respond to these messages.

One problem is that most of the messages on a large network may not be intended for those printers. However, if the messages are requesting 3D printer data, then in many cases software operating a 3D printer must respond to those messages. In a facility with hundreds of 3D printers this can easily place a significant load on the systems that respond. In practice, it is not unusual for messages to s specific printer to cause side effects that are detrimental to jobs in progress on other machines. The technology disclosed herein can mitigate these impacts by extracting and transforming 3D printer information with minimal impact, and then uploading that information using a messaging system that does not overburden the computers that are acting as printer servers or otherwise operating as a primary interface to a 3D printer.

In the following examples, which also account for a significant proportion of the commercially available 3D printers, the detailed job control software is designed to run on a third computing process that has access to the relevant low-level diagnostic and service messages. In this case, the aggregator often requires a privileged position on the network or computer system to be in the position of extracting raw printer data from the normal flow of information to and from the printer. A printer-server that sends and receives data to and from a printer is an example of a privileged position, since it allows an aggregator to monitor and capture this data.

Once raw printer information has been extracted from captured data, the aggregator transforms it into a canonical format that can be uploaded to a networked database where it can be viewed and shared among many users. Using a client-centric queued messaging system like Kafka is an effective approach for uploading because it allows a client to determine when to send messages so as not interfere with real-time processes that may also be executing. Alternatively, other message or queue managers may be used. An example is when an aggregator is running on a printer-server that is streaming a 3D print job to a 3D printer in real time. The aggregator, since it can continually monitor this real-time stream, can determine when to upload collected data based on the state of the print job. For example, it could wait until the printer is in an idle state to upload data.

Additionally, to further help mitigate real-time impacts, a private line or virtual private channel can be created between a specific network application and a computer serving or controlling a 3D printer, thus obviating the need for the computer to respond to or process messages unintended for its 3D printer(s). This private line can remain open or be closed after a single transaction.

Another benefit of using a messaging system like Kafka to upload data gathered by an aggregator is that Kafka is designed for use as a high-speed message brokering system and can be easily scaled. Together with its client-centric design and guaranteed delivery, a messaging system like Kafka is well-suited for repurposing and adaptation to industrial control of real-time manufacturing processes implemented on non-RTOS systems like Windows. When, combined with an aggregator and extraction software, a unique solution can be provided for the emerging needs of multivendor 3D printing facilities.

Figure 18:
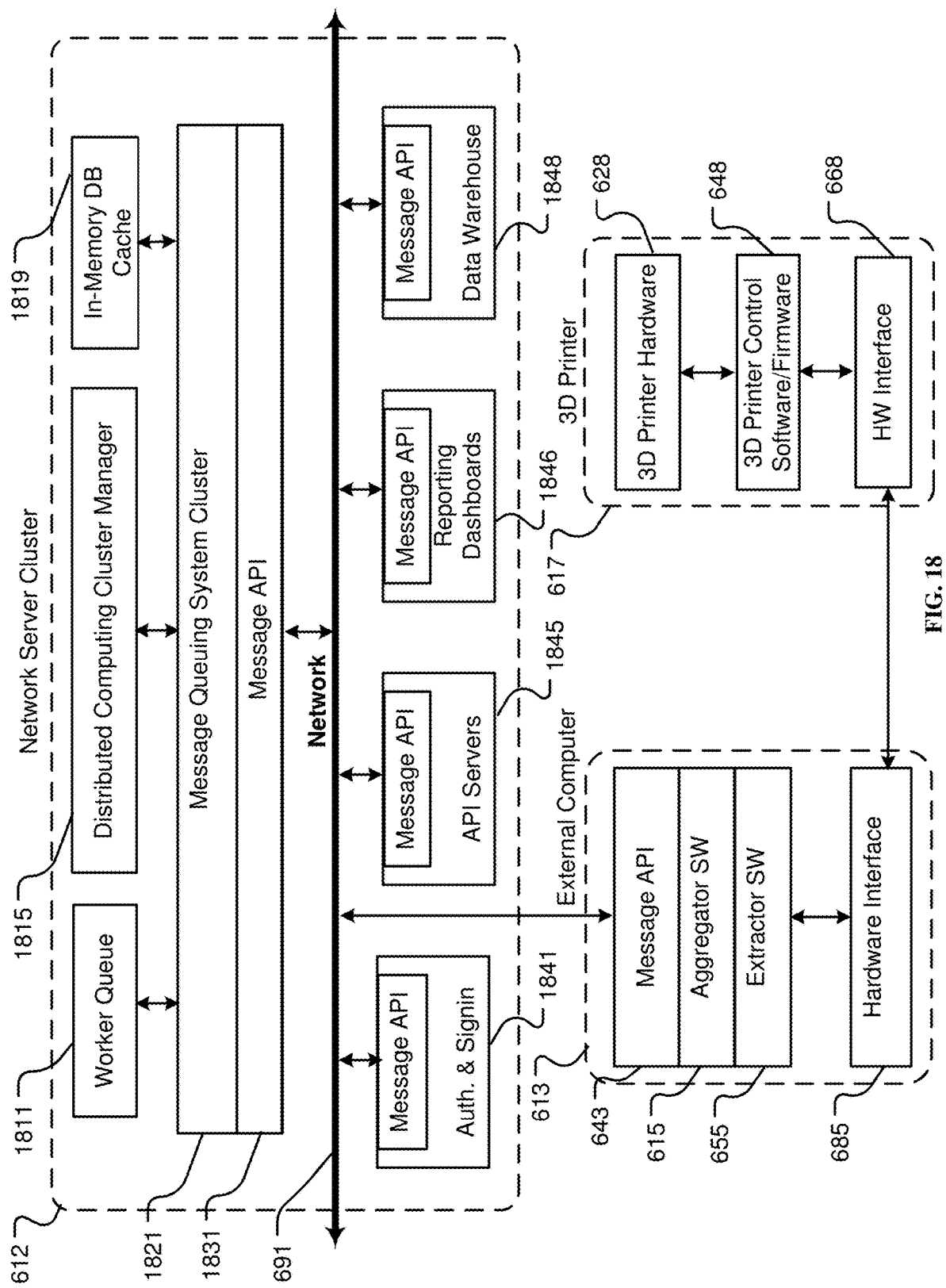
FIG. 18 is a different view of the overall architecture shown in FIG. 6 that shows a detailed block diagram of the microservices and storage software and message API.

FIG. 18 is a different view of the overall architecture shown in FIG. 6 that shows a detailed block diagram of the microservices and storage software 612, and message API 641 shown in FIG. 6. Various services are shown, including an authorization and sign-in service 1841, API servers 1845, reporting dashboards 1846 and a data warehouse 1848. All of these, as well as a worker queue 1811 and in-memory database cache 1819 interact with the aggregator 615 via the network 691.

These services interact using a client-centric messaging system like Kafka. When a client's producer sends a message, the messaging system responds that the message request either can or cannot be processed. If the message can be processed, then it is sent; otherwise the producer can retry at a future time. This frees the client to perform other tasks until it is ready to try sending the message again. Conversely, clients can choose when their consumer functions receive messages. Again, this allows clients like an aggregator to send and receive messages at times that can minimize the impact on any real-time processes that may be affected by delays in execution.

In this type of client-centric messaging system, messages are sent to a message broker like Kafka via a message API 1831, queued in a message queuing system cluster 1821 and are available to a receiver when it is ready to accept them. In this model a sender is called a "producer," and a receiver is called a "consumer." Producers can be created using, for instance, the Kafka API. Producers create messages and "publish" them by sending them to particular "topics" to which consumers can "subscribe" by listening for messages on that topic. Hence, this system can also be described as a "publish-subscribe" model.

In Kafka, topics are bound to "partitions" that store messages in the order received, similar to a FIFO (first-in-first-out) queue. The difference is that messages in a client-centric system like Kafka can remain in a partition or queue as long as desired, whether they are read by a consumer or not. They are not removed after they are read, although this can be implemented optionally if desired. When applied to a subscription to a topic, this property is called "durability" and allows messages to remain in a partition even if network connectivity is lost, so that when it is restored, consumers that are sub scribed to that topic can retrieve their messages. Durability is often applied when a message is sent to a topic to which many consumers are subscribed using multiple queues.

Another term similar to durability is persistence, which is typically applied to queues as opposed to topics. A message is said to persist in that if a failure occurs during message processing, the message will remain in its original location after the messaging system recovers from a failure, thus allowing a consumer to retrieve it. Another benefit of persistent or durable messaging is that it can provide an audit trail for troubleshooting printer jobs.

Kafka partitions, which can be thought of as a collection of one or more queues with additional capabilities, also have another property: any message in them can be read using a pointer or cursor, called an "offset" in Kafka terminology. Thus, Kafka partitions are based on queues that provide durable messaging and the ability to read to any depth in a queue using an offset as a pointer or cursor.

The technology disclosed herein minimizes the need for an aggregator to respond by interposing a message API 643 between an aggregator 615 and a network 691 to which it is connected. The message API filters out any messages that are not intended for its corresponding aggregator. In doing so, it isolates the aggregator from network traffic that could impact its performance, and hence jobs that are running on attached printers. This is a benefit because multiple 3D printers or other digital manufacturing machines connected to the network, each aggregator and its host computer may be exposed to a plethora of unintended messages.

This can happen because each message must be examined before being processed with a response or ignored. One reason for this is that individual printers may not be assigned their own unique IP address. In fact, they may not have TCP/IP connectivity as illustrated for the basic USB interface printer in FIG. 7B. The only way to communicate with these printers is via their host computer and the software running on it that controls the printer. This problem is also present on some industrial 3D printers as shown in previous examples.

As an example, a message may be sent to a particular printer to return status information, however the sending software may send the message to a queue, or Kafka topic, that is read by many aggregator clients. Thus, although the message was intended for only one specific printer, many printers would receive it and need to process it to determine if they should respond. This can cause problems in a facility with many 3D printers. A message API, as disclosed herein, would determine that the message was either for its aggregator and printer(s), or not. If not, then no aggregator or lower level processing would be required, thus conserving computing resources and minimizing real-time impacts.

Another function of the message API is to respond to an aggregator request to send a message that either the message was delivered or not. A message is considered delivered after it has been accepted by a message broker and queued for clients to read it. The advantage of this approach is that a message can have fewer node-to-node network "hops" to travel to reach a message broker versus traveling round-trip to its final destination and waiting for that client to confirm acceptance of the message. Further, a message brokering system can be used that provides high availability and high reliability as well to eliminate the need for clients to provide this type of redundancy and resilience.

This "guaranteed delivery" capability allows the aggregator to continue processing as soon as it receives a response. Since an aggregator operates within the context of a real-time system and may lose data or force a time-critical control process to wait, this provides an effective method for it to efficiently relinquish control to other processes.

The technology disclosed herein uses a message broker that has the desired features. In the test implementation used to generate the data shown in the previous figures, Kafka (https://kafka.apache.org/) was chosen as the message broker. Kafka is an open source message broker that utilizes a client-centric publish-subscribe model in combination with a distributed computing cluster to provide high availability, high reliability communications with guaranteed delivery. This brings an additional degree of flexibility to allow scaling of the architecture shown in FIG. 6A using the messaging system detailed in FIG. 18. By using a message API that includes additional fields, a message broker's capabilities can be extended to establish a private line or virtual private channel between two network processes using the message API.

When an aggregator 615 sends a message, perhaps to upload a packet, its corresponding message API 643 receives a response that the message was either delivered or not If the message was not delivered, then the aggregator can set a timer to call it at a later time to try again, or forego delivering the message. If the message was delivered, it can be logged as delivered.

In normal use, message groups called topics are pre-assigned when using Kafka. Topics are used as identifiers for messages that belong to the same publish or subscribe group. They are intended to be setup before use and persist. However, in order to take advantage of Kafka's client-centric capability and still ensure virtual point-to-point messaging between a printer aggregator and a network service, topics can be instantiated dynamically. Further, by adding additional fields in the message itself, Kafka can be extended to facilitate a virtual private channel between an aggregator and other network services. The message APIs in FIG. 18 were designed to implement this capability.

One way to do this is to have a producer (sender) create a topic using a unique identifier, then create a consumer that listens for that particular topic. This will be the only consumer on the network that subscribes to that topic since the topic is itself a unique identifier.

There are many options for creating unique identifiers. In one implementation, the current date, time, job number and printer serial number can be hashed using any one of several hashing algorithms. SHA-256 is a frequently used standard. This hash value can be used to create a unique topic. In another implementation, a Windows GUID (globally unique identifier), also called a UUID (universally unique identifier) can be created using software available in a Microsoft Windows development environment. Many different techniques and algorithms can be used to create a unique identifier. Those skilled in the art will be familiar with them.

The software that created the producer, the consumer and the unique identifier can include this unique identifier as the return topic identifier for subscribers that process the original message to be sent by the producer. When the message is received by another consumer, it can extract the return topic (the unique identifier) and send a confirmation message to it. This confirmation message will then be visible to the original process that created the unique identifier since that process also created its subscriber.

In this way, an aggregator and a network service can effect a private line or virtual private channel which no other message API will be listening to. This creates a virtual private channel. Further, a counter or timer can be included in the topic which instructs the message broker to destroy the topic after it has been returned to the producer. Used this way, Kafka can be used to ensure that each message is delivered and processed independently.

Figure 19:
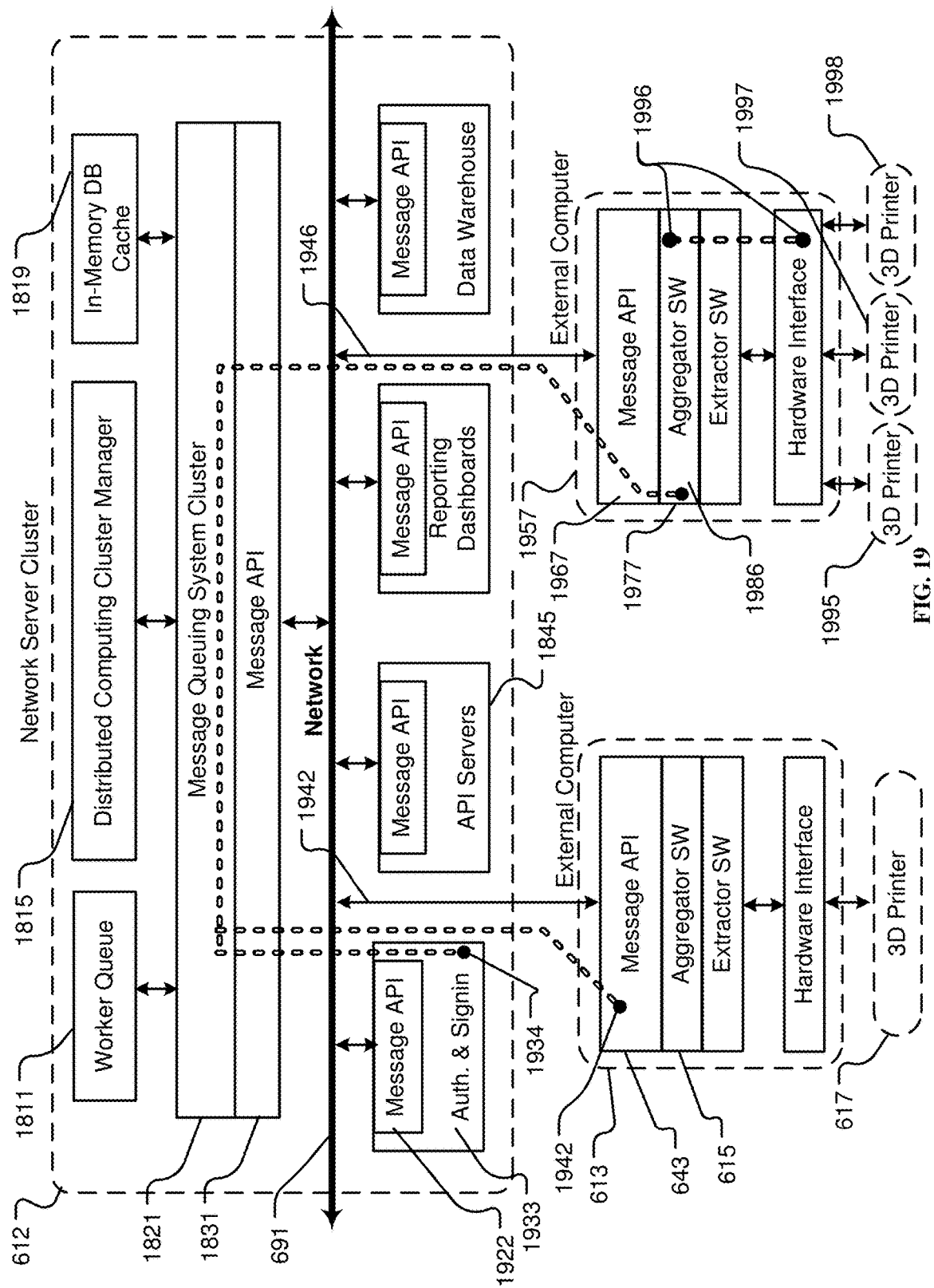
FIG. 19 shows an example of how a message queuing system and its APIs can be used to create a private line or virtual private channel.

FIG. 19 shows an example of how a message queuing system and its APIs can be used to create a private line or virtual private channel between an aggregator 1986 and a networked authorization and sign-in service 1933. In this example, a message is being sent from an aggregator 1986 to an authorization and sign-in service 1933 which will then return a response to the aggregator 1986.

To illustrate how a private line or virtual private channel can work, consider the message path indicated by the double-dashed line from 1977 to 1934. The message is transmitted via a network 691 and is visible to all other message APIs on the network. One of these is message API 643 which corresponds to a different aggregator 615. However, message API 643 is not listening for this message, i.e. it is not "subscribed" to the topic attached to this message. Consequently, when the message is received it is discarded and is not passed through to its aggregator 615. Similarly, none of the other message APIs will allow the message to pass through to their corresponding processes, except for message API 1922 which is listening for the message since it is subscribed to the topic attached to the message. A further explanation and example follow using aggregator 1986 as the initial source, and the authorization and sign-in service 1933 as the initial destination.

The requested service, authorization and sign-in 1933, is not addressed using a unique IP address as may be customary in other communication systems. Instead, it is accessed within the network server cluster which uses a distributed computing cluster manager 1815 to coordinate clustered computing resources, including Kafka as the queued messaging cluster 1821 in this example.

In this publish-subscribe model, the authorization and sign-in service 1933 creates a subscriber that listens for a pre-defined topic that is known to the message APIs in the system. This allows any aggregator to perform authorization and sign-in from anywhere on the network. In this example that topic is "USER AUTHORIZATION" and it will be used for the initial authorization and sign-in request sent from aggregator 1986.

Before sending its message to the authorization and sign-in service 1933, the aggregator 1986 creates a unique identifier for use as its own private topic. It then includes this identifier with the message it wishes to send to the authorization and sign-in service 1933. It also requests its corresponding message API to create a "consumer" that "subscribes" to this unique identifier as its topic. In other implementations, additional topics could be added to this consumer.

The aggregator 1986 then requests its message API 1967 to send the message to topic "USER_AUTHORIZATION". The message API 1967 sends the message and in this example receives a response that the message was delivered after the message queuing system 1821 receives the message and queues it for the authorization and sign-in service 1933 since it has subscribed to this topic. Since the message was guaranteed to be delivered, the aggregator 1986 can continue working and check its message queue for a confirmation response at a later time of its choosing.

After processing the message, the authorization and sign-in service 1933 prepares a confirmation response and sends it back to the topic comprising the unique identifier created by the aggregator 1986. The subscriber created by the aggregator 1986 receives the response since it is subscribed to this unique topic. It can pass the response to the aggregator 1986 so that confirmation of the message delivery can be logged. If desired, the topic can now be destroyed to ensure that each message is processed independently. An alternative way to destroy the topic is to set an expiry counter or expiration time. This example has shown how a message queuing system like Kafka can be used to create a private communications channel or private line that isolates receiving processes from messages not intended for them.

Isolating aggregator software from unintended messages is useful because for some messages, an aggregator may need to access 3D printer data and in so doing, it can impact the real-time operation of a 3D printer. As an example, some messages may request detailed printer status data that must be obtained via a request from an aggregator to the 3D printer. For instance, obtaining updated EOSINT M280 FIG. 8B status data as described in FIGS. 10,11A and 11B is an example of performing a SQL query to the internal database of the 3D printer. In a facility with many of these printers, many of their aggregators may be listening on the same queue for status requests. If required to respond to every EOSINT M280 status request this would result in significant computing overhead that would burden the 3D printers as well as the network. An aggregator's message API can filter incoming messages and discard any that are not for its aggregator.

Figure 20A:
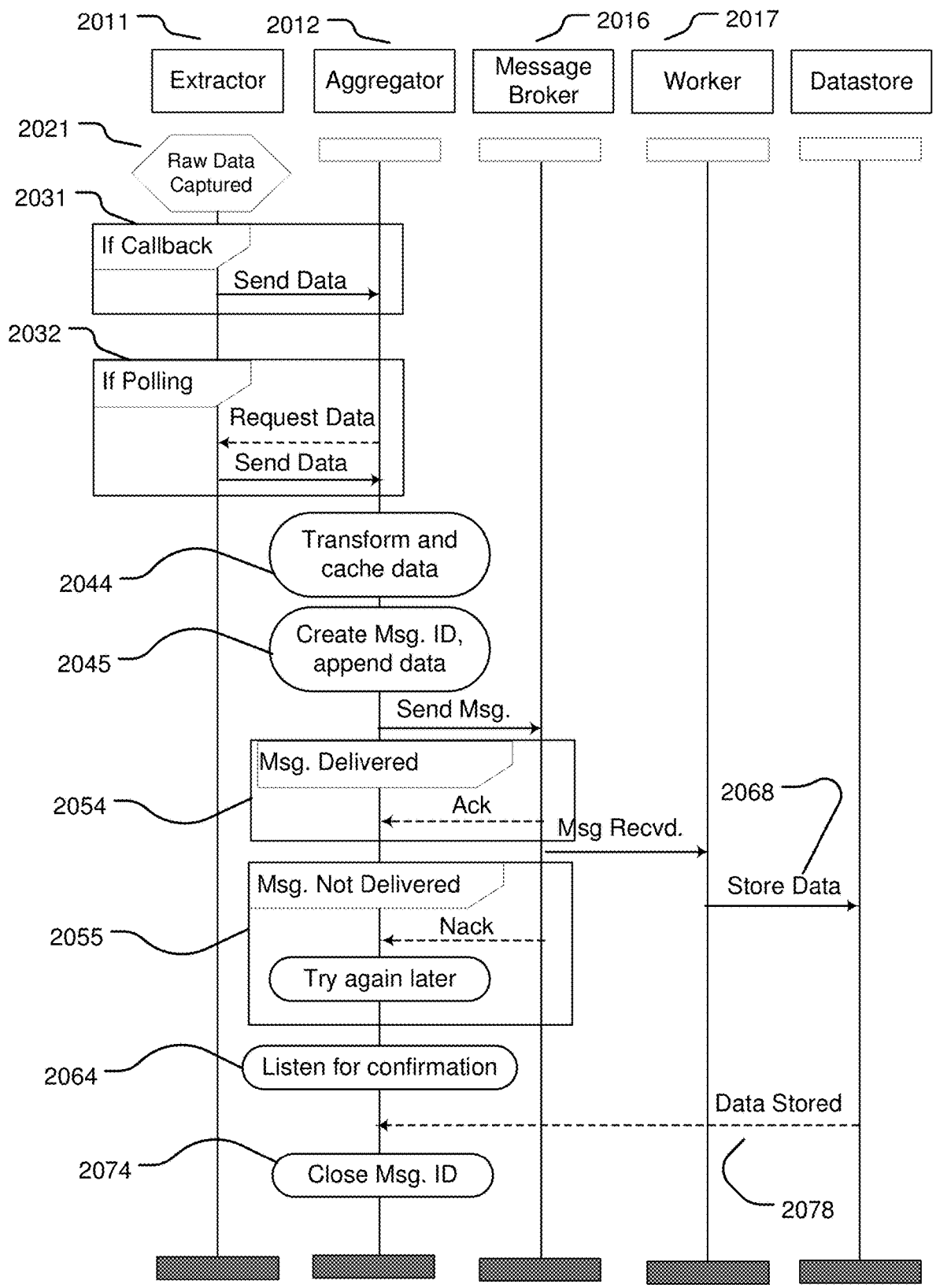
FIG. 20A shows a message sequence chart based on the message exchange described for FIG. 19.

FIG. 20A shows a message sequence chart based on the message exchange described for FIG. 19. In this example, a packet is uploaded and stored in the networked database. The message sequence begins with capturing raw data 2021 into a buffer by the extractor software 2011 which corresponds to 655 in FIG. 18. The aggregator indicated at 2012 corresponds to 615 in FIG. 18. The message broker 2016 corresponds to 1821 in FIG. 18. The datastore or data warehouse 2017 corresponds to 1848 in FIG. 18.

One of two methods is used by the aggregator 615 and extractor 655 software to retrieve the data. If a callback 2031 is used then the aggregator 615 is called when the data is ready, and it may accept the data at this time. If polling is used, then the aggregator 615 can use a polling process, which can be run as a background process, to request the data at specified intervals. In testing scenarios, an interval of one second was used. If data is ready then it is sent to the aggregator for processing. The aggregator at 615 in FIG. 18 will be used in the remaining example for FIG. 20A.

The aggregator 615 transforms and caches the data 2044. Then it dynamically creates a unique topic, a message including the unique topic as the return topic, a producer to send the message and a consumer subscribed to the unique topic to receive the response. The aggregator requests via its message API 643 to send the newly prepared message to the data warehouse 1848 using a pre-defined topic like "UPLOAD_DATA" to which a datastore client consumer is subscribed.

The message API 643 receives the message request and replies that either the message was delivered or not, since it is in communication with the message queuing system cluster 1821, perhaps using a heartbeat to maintain ongoing communication. If the message API 643 replies that the message was delivered, the aggregator can set a background process to listen for and log a confirmation response if one is expected 2064.

If the message is delivered, the data warehouse 1848 receives the message, stores the data 2068 and responds with an acknowledgement 2078. If the message is not delivered 2055, then the aggregator 615 can set a timer and try again later to deliver the message. Once the message is delivered the message ID, i.e., the topic, can be closed 2074.

Figure 20B:
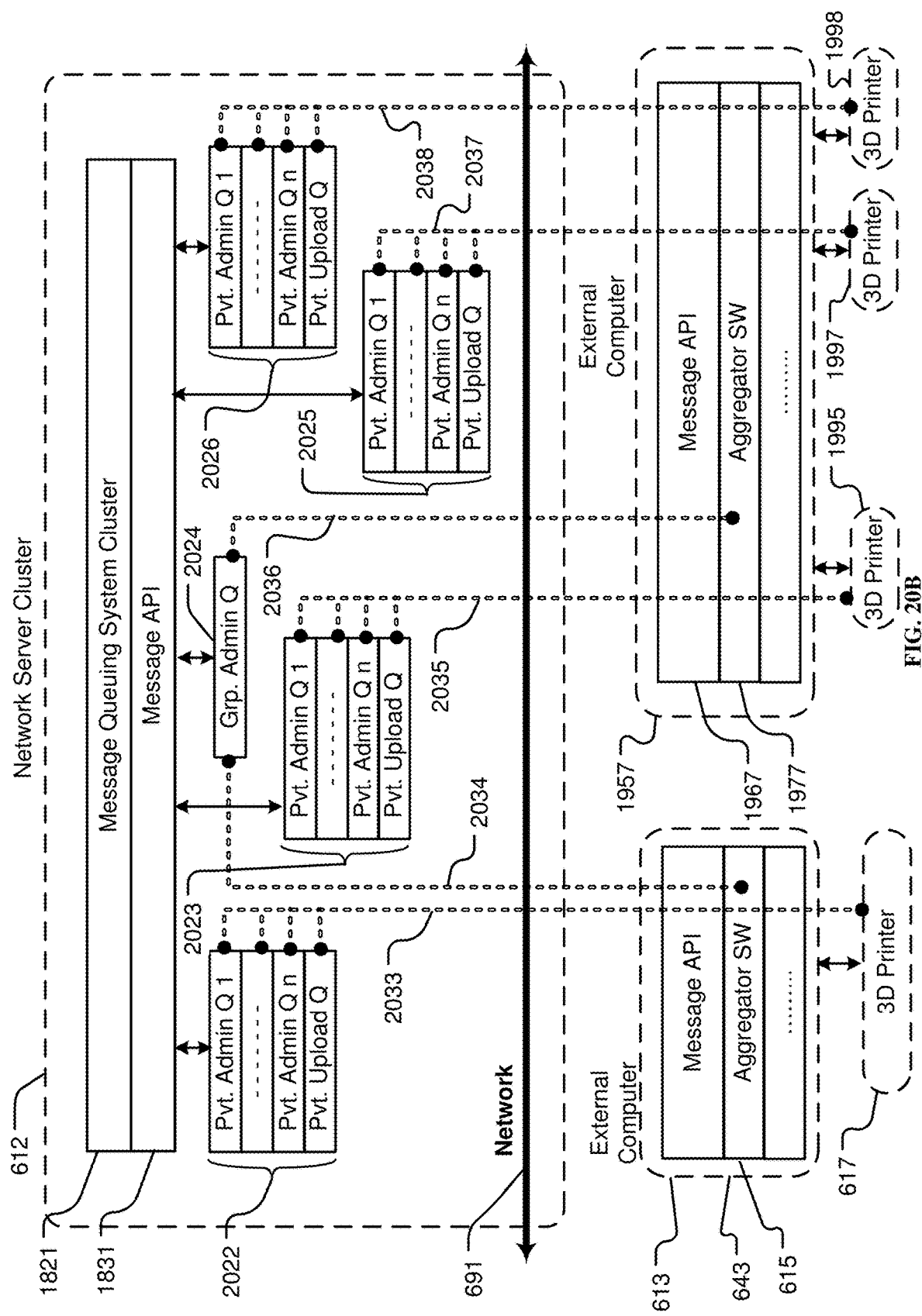
FIG. 20B shows an example of how message queues can be used to provide a "party line" to allow access for a group of subscribers as well as private lines to allow private access for specific subscribers.

FIG. 20B shows an example of how message queues can be used to provide a party line to allow access for a group of subscribers as well as private lines to allow private access for specific subscribers. The queues in this example can be implemented with persistent or durable messaging by a message queuing system 1821 and a message API 1831, which can also provide guaranteed delivery for message senders and a capability to read to any depth within a queue.

Kafka, as previously described, can utilize queues in a similar manner to provide group and private access, often implementing multiple queues per topic, but referring to such a collection of queues as a partition. Message persistence in this context is often called durability and can apply to a subscription to a topic: a durable subscription is one which retains messages in its partitions (in Kafka terminology), and thus in queues that comprise a partition, even if network connectivity is lost, so that when it is restored, consumers that are sub scribed to that topic can retrieve their messages.

In FIG. 20B, there is one group administrative queue 2024 that can be used as a "party line" which many aggregators can use for messages that would apply to many printers, such as announcing the availability of a new update. This example shows two aggregators 615 and 1977, both of which would receive such a message via this party line, or group communications channel, shown as 2034 and 2036. This figure also shows several sets of private queues 2022, 2023, 2025 and 2026 that can be used to establish a private line, or virtual private channel, with their respective 3D printers 617, 2035, 2037 and 2038.

In this example, the private queues are assigned to administrative messages or upload messages. In other implementations, there can be as many types of queues as needed or desired. For instance, in this example, there can be many private administrative queues for each printer to handle different functions: login, logout, material status, job status, startup, shutdown, update attempts, etc. Each printer in this example also has its own private upload queue shown in 2022, 2023, 2025 and 2026. Each of these private queues can be implemented as a private line or virtual private channel by using unique topic names as previously described.

The collection of private lines connecting private queues 2022 to 3D printer 617 is indicated by 2033. Similarly, for printers 1995, 1997 and 1998 that use private queue collections 2023, 2025 and 2026.

Private lines and party lines can be combined to perform a transaction in different ways. For instance, an aggregator 617 may retrieve a message via a party line 2034 from a group administrative queue 2024 that indicates a new update is available. The aggregator can then use a private line from 2033 to contact a first private administrative queue in 2022 and request the update. The update can then be retrieved via a second private administrative queue in 2022 over a different private line in 2033 to avoid burdening the group administrative queue 2024. Lastly, the update attempt and final update status can be sent to a network service for logging via a third private administrative queue in 2022 to complete the transaction.

FIGS. 21-24 follow and contain examples of displays that show various information about printers and jobs, including aggregated statistics compiled from many separate jobs from different printers.

Figure 21:
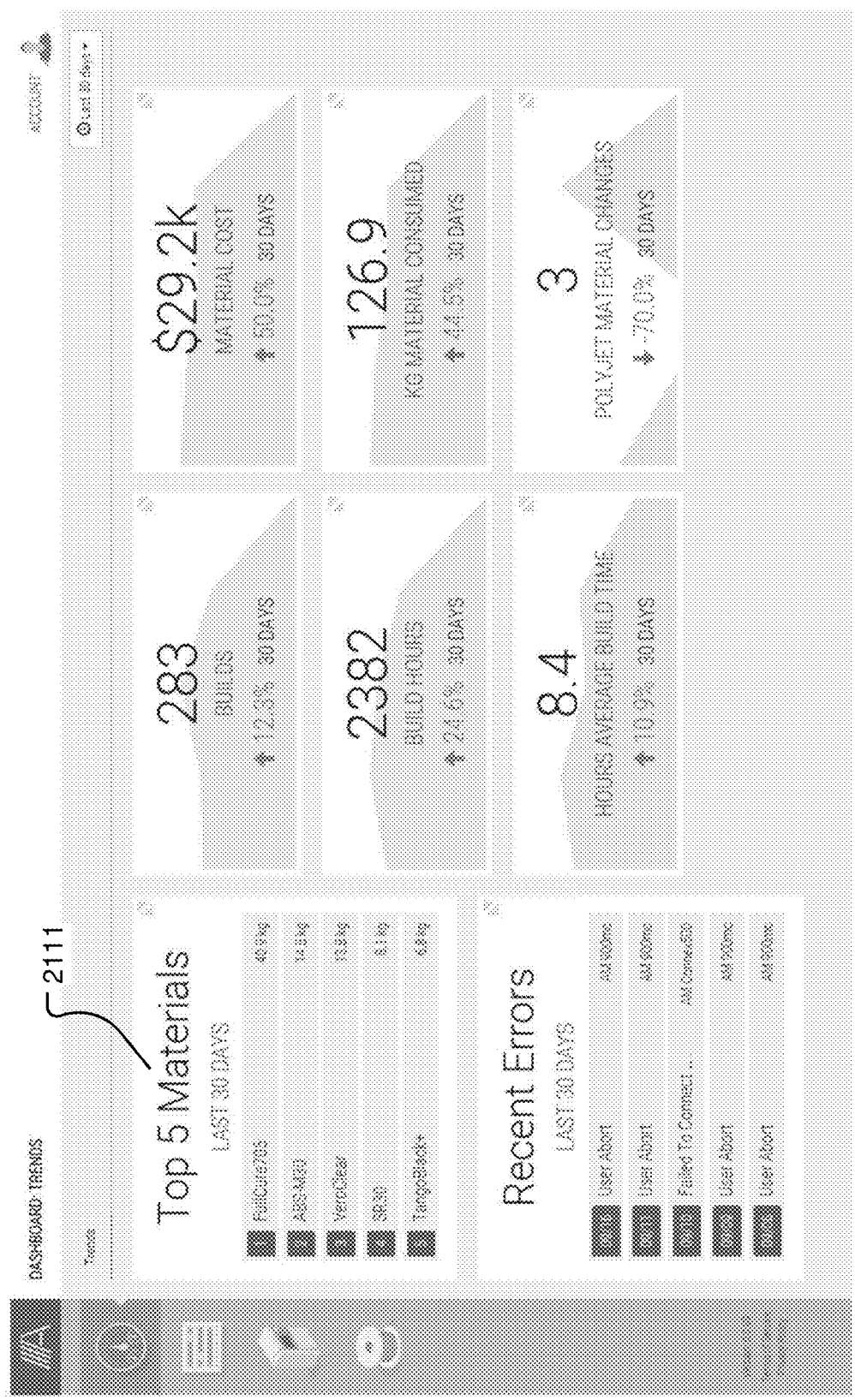

FIG. 21 shows a screen capture of a dashboard that indicate trends in materials used and other aggregated statistics. As an example, 2111 shows the top 5 materials used in the last 30 days. This is an aggregated result from multiple 3D printer which can be from different manufacturers.

Figure 22:
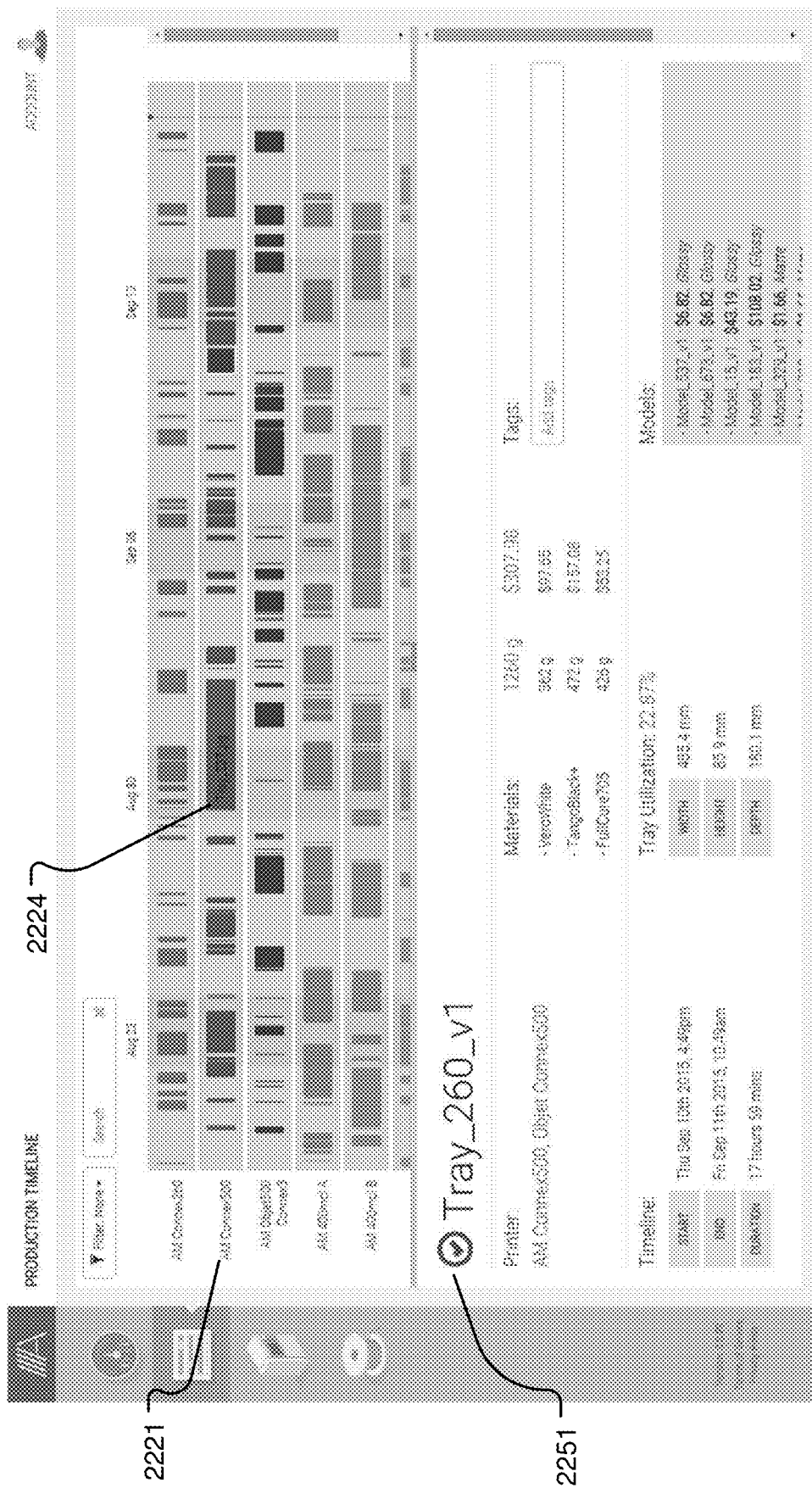

FIG. 22 shows a dashboard timeline for a selected job 2224 on a selected printer 2221. The job name selected at 2224 is displayed at 2251 along with it details.

Figure 23:
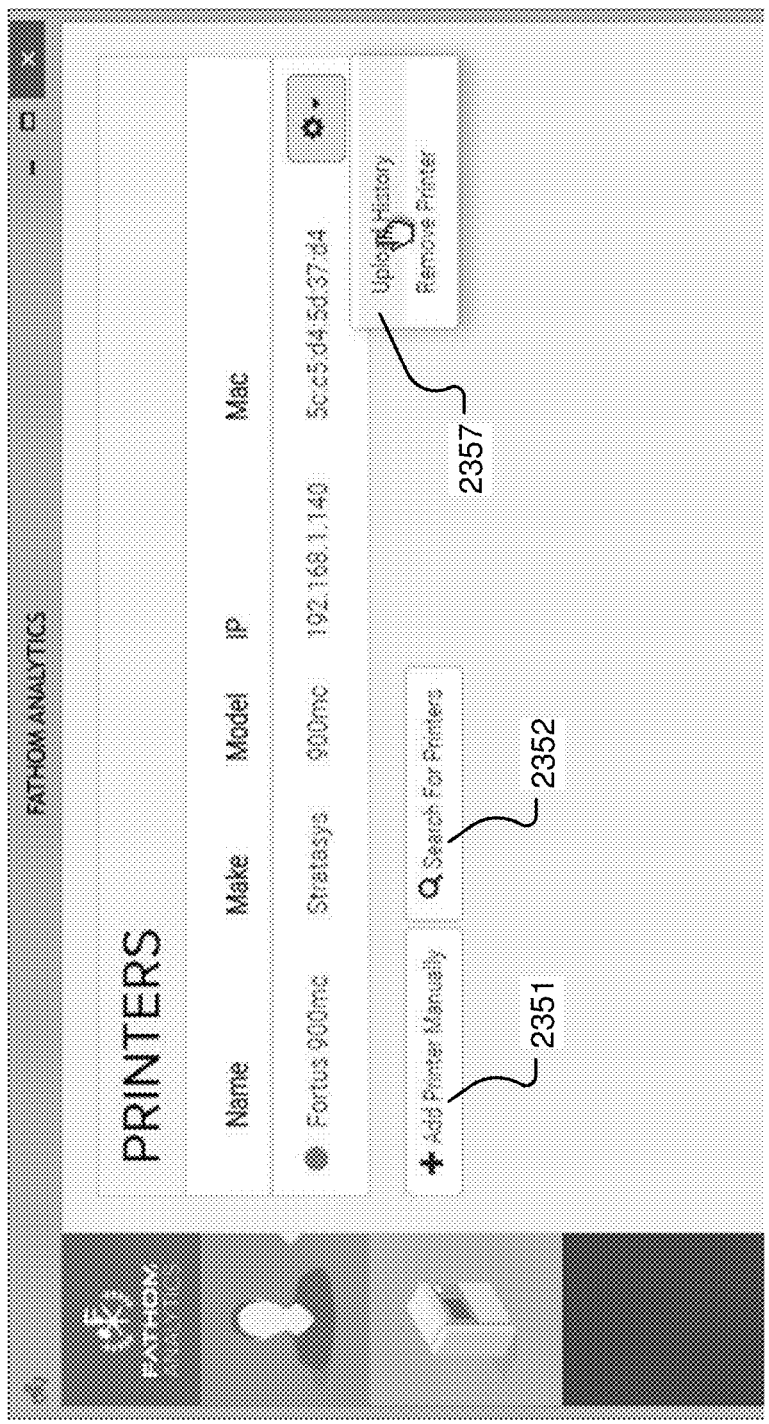

FIG. 23 shows a request to upload the history 2357 for a particular printer. This screen also includes options to manually add a printer 2351 and search for printers 2352.

FIG. 24 shows a printer status screen that displays a summary for several printers. The printer names are given in column 2411, and details follow. For example, at 2452 the process "Polyjet" indicates the type of printer. The next column to the right indicates the progress: the printer is in the process of printing layer 1270 out of a total 2592 layers. The estimated end time, materials and last update are also given.

Particular Implementations

The technology disclosure can be implemented as a system for collecting data from 3-D printers, with counterpart methods and computer readable media. One system implementation of the technology disclosed, includes a data extractor add-on to a 3-D printer, the data extractor coupled in communication with an aggregator that is coupled in communication over a network with a client-centric queued messaging system. In many following paragraphs and in the claims we use the abbreviation "CCQMS". The data extractor is configurable to obtain requested data from the 3-D printer and forward it to the aggregator. The aggregator is configurable to cause the CCQMS to initialize a private line distribution queue and a private line collection queue for private use with a particular 3-D printer. The CCQMS further configurable to provide at least one party-line distribution queue and multiple private line distribution and collection queues, each having a unique queue label. The CCQMS, when operating a collection queue, responds to a prepare-to-receive request with a confirmation that it is ready to receive data without flow control and thereafter receives the data without flow control and without dropping parts of the data. The CCQMS, when a operating party-line or private line distribution queue, responds to a pull request that includes the unique queue label by distributing requested information responsive to the pull request via the queue that has the unique label. The aggregator is configurable to communicate with the CCQMS using the initialized private line distribution queue and the initialized private line collection queue and is further configurable to obtain broadcast messages from the CCQMS via the party-line distribution queue. In this context, "configurable" means supported by the system as delivered and configurable by an end user who operates the system, either by invoking the feature described or by selecting an option to implement the feature in the system.

This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations such as a CCQMS system, method or CRM (computer readable media) or a message distributor and message log system, method or CRM.

In an implementation of the system, each private line distribution queue is paired with a private line collection queue. The paired private line distribution and collection queues are secured upon initialization with a locally unique encryption that is known to the CCQMS and the aggregator.

The system is readily extended to include multiple data extractor add-ons to multiple 3-D printers mutually in communication with the aggregator.

As described above, there are several modes of data extractor operation, consistent with several styles of 3-D printer architecture. One mode, for reading serial data, relies on snooping (listening to) a USB connection. Another mode reads packets via standardized network communications protocols including TCP/IP and UDP. In yet another mode, the data extractor periodically polls for database updates. Or, it could receive pushed database updates.

In an implementation of the system, the CCQMS is further configurable to provide multiple party-line collection queues. Multiple aggregators communicate with 3-D printers and with the CCQMS. The aggregators using the party-line collection queues to announce a 3-D printer coming on line and to announce job completions to the CCQMS. In some implementations, the aggregators are configurable event-wise to selectively use private line or party-line collection queues to announce 3-D printer events to the CCQMS. Different event types are handled via different queues.

In another system implementation for collecting data from 3-D printers, each 3-D printer including a printer server, and the system includes a client-centric queued messaging system (abbreviated CCQMS), an aggregator add-on to a 3-D printer, and a data extractor add-on to the 3-D printer. The CCQMS is configurable to provide at least one party line distribution queue, one private line distribution queue, and one private line collection queue, each having a unique queue label. The CCQMS serves information from the party line and private line distribution queues in response to pull requests that include the unique queue labels, rather than pushing data to clients. The CCQMS responds to a prepare-to-receive request with a confirmation that it is ready to receive data without flow control and then receives the data without flow control and without dropping parts of the data. The aggregator, coupled in communication with CCQMS, causes the CCQMS to configure the private distribution queue and the private line collection queue and to communicate unique queue labels that identify the configured private distribution queue and the private line collection queue for private use with a particular 3-D printer. The data extractor, coupled in communication with the aggregator, is configurable to obtain requested data from the 3-D printer for routing to an appropriate queue.

The features of the first system can be used with this second system implementation. For the sake of conciseness, they are not all reiterated here; incorporation by reference will suffice.

Viewed as a method, the technology disclosed can be practiced as a method of collecting data from 3-D printers. This method uses a data extractor add-on to a 3-D printer, the data extractor coupled in communication with an aggregator that is coupled in communication over a network with a CCQMS. The method includes the data extractor obtaining data from the 3-D printer and forwarding it to the aggregator and the aggregator causing the CCQMS to initialize a private line distribution queue and a private line collection queue for private use with a particular 3-D printer. The CCQMS has features. It initializes at least one party-line distribution queue and multiple private line distribution and collection queues, each having a unique queue label. When operating a collection queue, the CCQMS responds to a prepare-to-receive request with a confirmation that it is ready to receive data without flow control and thereafter receives the data without flow control and without dropping parts of the data. When operating a party-line or private line distribution queue, the CCQMS responds to a pull request that includes the unique queue label by distributing requested information responsive to the pull request via the queue that has the unique label. The method further includes the aggregator communicating with the CCQMS using the initialized private line distribution queue and the initialized private line collection queue and further obtaining broadcast messages from the CCQMS via the party-line distribution queue.

The system features described above, in the system context, as well as features described through this application, are readily combined with the immediately preceding method implementation.

For instance, in a method counterpart implementation, each private line distribution queue is paired with a private line collection queue; and the paired private line distribution and collection queues are secured upon initialization with a locally unique encryption that is known to the CCQMS and the aggregator. And, as described above, there are several modes of data extractor operation, consistent with several styles of 3-D printer architecture. For the sake of brevity, not all of the features are reiterated here. Incorporation by reference will be sufficient.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above. The phrase "tangible computer readable media", in this application, excludes transitory wave forms that are unpatentable. While the invention could be practiced using a signal to transfer program instructions to a tangible readable media, the originally filed claims do not extend to unpatentable signals.

Another system implementation of the technology disclosed includes a data extractor add-on to a 3-D printer, the data extractor coupled in communication with an aggregator that is coupled in communication over a network with a message manager. Message manager is not limited to a Kafka-esqe queue manager. The data extractor is configurable to obtain requested data from the 3-D printer and forward it to the aggregator. The aggregator is configurable to cause the message manager to initialize a private line message distributor and a private line collection log for private use with a particular 3-D printer. The message manager is further configurable to provide at least one party-line message distributor and multiple private line message distributors and private line collection logs. The message manager, when operating a collection log, responds to a ready-to-receive request with a confirmation that it is ready to receive data without flow control and thereafter receives the data without flow control and without dropping parts of the data. The message manager, when operating party-line or private line message distributors, responds to a pull request by distributing requested information responsive to the pull request. The aggregator is configurable to communicate with the message manager using the initialized private line message distributor and the initialized private line collection log and is further configurable to obtain broadcast messages from the message manager via the party-line message distributor.

This system and other implementations of the technology disclosed can include one or more of the following features and/or features described in connection with additional systems disclosed. In the interest of conciseness, the combinations of features disclosed in this application are not individually enumerated and are not repeated with each base set of features. For instance, in an implementation, each private line message distributor is paired with a private line collection log. The paired private line message distributor and collection log are secured upon initialization with a locally unique encryption that is known to the message manager and the aggregator. Multiple data extractor add-ons to multiple 3-D printers are supported, in communication with the aggregator. Multiple modes of data extractor operation are supported.

In an implementation, the message manager is further configurable to provide multiple party-line collection logs. Multiple aggregators in communicate with 3-D printers and with the message manager. The aggregators use the party-line collection logs to announce a 3-D printer coming on line and to announce job completions to the message manager. In some implementations, queue usage is selectively configurable based on event type.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A system for collecting data from 3-D printers, including:
a message queuing system coupled in communication over a network with a plurality of 3-D printers via aggregator software to one or more subgroups of respective individual 3-D printers;
wherein the message queuing system is configured to provide, for group administration, at least one party-line queue used to broadcast messages to the 3-D printers, as a group;
wherein the message queuing system is further configured to provide, for individual administration, a plurality of private-line queues used to exchange messages with respective 3-D printers, individually and privately; and
wherein the private-line queues are configured for the message queuing system to send data to the respective printers in response to pull requests and to receive data from the respective printers without imposing flow control and without dropping parts of the data.

2. The system of claim 1, further including each private-line queue having a unique queue label.

3. The system of claim 1, further including the message queuing system initializing at least one private-line queue responsive to a request from the aggregator software.

4. The system of claim 1, wherein:
each private-line queue includes a private distribution queue paired with a private collection queue; and
the paired private distribution and collection queues are secured upon initialization with a locally unique encryption.

5. The system of claim 1, further including a data extractor coupled between an individual 3-D printer and an instance of the aggregator software, wherein the data extractor is configured to obtain data from the individual 3-D printer and forwarding it to the aggregator software.

6. The system of claim 5, wherein the data extractor is configured to read serial data sent or received by the individual 3-D printer by snooping a USB connection.

7. The system of claim 5, wherein the data extractor is configured to read packets sent or received by the individual 3-D printer by processing packets from a standardized network communications protocol.

8. The system of claim 1, wherein the party-line queue is further configured to use the party-line queue receive, from the aggregator, announcements of a 3-D printer coming on line and of job completions.

9. The system of claim 1, wherein the party-line queue is further configured to selectively use the private-line or party-line queue to receive, from the aggregator, announcements of a 3-D printer coming on line and of job completions.

10. A method for collecting data from 3-D printers, using a message queuing system coupled in communication over a network with a plurality of 3-D printers via aggregator software to one or more subgroups of respective individual 3-D printers, the method including:
the message queuing system providing, for group administration, at least one party-line queue and using the party-line queue to broadcast messages to the 3-D printers, as a group;
the message queuing system further providing, for individual administration, a plurality of private-line queues and using the private-line queues to exchange messages with respective 3-D printers, individually and privately; and
wherein using the private-line queues further includes the message queuing system sending the respective printers in response to pull requests and receiving data from the respective printers without imposing flow control and without dropping parts of the data.

11. The method of claim 10, wherein each private-line queue is identified by a unique queue label.

12. The method of claim 10, further including the message queuing system initializing at least one private-line queue responsive to a request from the aggregator software.

13. The method of claim 10, further including:
each private-line queue using a private distribution queue paired with a private collection queue; and
securing the paired private distribution and collection queues upon initialization with a locally unique encryption.

14. The method of claim 10, further including using a data extractor, coupled between an individual 3-D printer and an instance of the aggregator software, the data extractor obtaining data from the individual 3-D printer and forwarding it to the aggregator software.

15. The method of claim 14, further including the data extractor reading serial data sent or received by the individual 3-D printer by snooping a USB connection.

16. The method of claim 14, further including the data extractor reading packets sent or received by the individual 3-D printer by processing packets from a standardized network communications protocol.

17. A non-transitory computer readable medium impressed with instructions for collecting data from 3-D printers, using a message queuing system coupled in communication over a network with a plurality of 3-D printers via aggregator software to one or more subgroups of respective individual 3-D printers, that, when executed on hardware, cause the hardware to take actions including:
the message queuing system providing, for group administration, at least one party-line queue and using the party-line queue to broadcast messages to the 3-D printers, as a group;
the message queuing system further providing, for individual administration, a plurality of private-line queues and using the private-line queues to exchange messages with respective 3-D printers, individually and privately; and
wherein using the private-line queues further includes the message queuing system sending the respective printers in response to pull requests and receiving data from the respective printers without imposing flow control and without dropping parts of the data.

18. The computer readable medium of claim 17, wherein each private-line queue is identified by a unique queue label.

19. The computer readable medium of claim 17, further including instructions that, when executed on the hardware, cause the hardware to take actions including the message queuing system initializing at least one private-line queue responsive to a request from the aggregator software.

20. The computer readable medium of claim 17, further including instructions that, when executed on the hardware, cause the hardware to take actions including:
each private-line queue using a private distribution queue paired with a private collection queue; and
securing the paired private distribution and collection queues upon initialization with a locally unique encryption.

21. The computer readable medium of claim 17, further including instructions that, when executed on the hardware, cause the hardware to take actions including using a data extractor, coupled between an individual 3-D printer and an instance of the aggregator software, the data extractor obtaining data from the individual 3-D printer and forwarding it to the aggregator software.

22. The computer readable medium of claim 21, further including instructions that, when executed on the hardware, cause the hardware to take actions including the data extractor reading serial data sent or received by the individual 3-D printer by snooping a USB connection.

23. The computer readable medium of claim 21, further including instructions that, when executed on the hardware, cause the hardware to take actions including the data extractor reading packets sent or received by the individual 3-D printer by processing packets from a standardized network communications.

* * * * *